(12) United States Patent
Park et al.

(10) Patent No.: US 9,936,192 B2
(45) Date of Patent: Apr. 3, 2018

(54) IMAGE PROCESSING METHOD AND APPARATUS

(71) Applicant: Samsung Electronics Co., Ltd., Suwon-si, Gyeonggi-do (KR)

(72) Inventors: Juyong Park, Seongnam-si (KR); Dong Kyung Nam, Yongin-si (KR); Seok Lee, Hwaseong-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 286 days.

(21) Appl. No.: 14/715,937

(22) Filed: May 19, 2015

(65) Prior Publication Data

US 2016/0050409 A1    Feb. 18, 2016

(30) Foreign Application Priority Data

Aug. 18, 2014  (KR) .................. 10-2014-0107172

(51) Int. Cl.
*H04N 13/04* (2006.01)
*G02B 27/22* (2018.01)

(52) U.S. Cl.
CPC ..... *H04N 13/0445* (2013.01); *G02B 27/2214* (2013.01); *H04N 13/0402* (2013.01); *H04N 13/0404* (2013.01); *H04N 13/0422* (2013.01); *H04N 13/0484* (2013.01)

(58) Field of Classification Search
CPC .......................... H04N 13/0445; G06T 15/06
USPC .............................. 348/54; 345/419
See application file for complete search history.

(56) References Cited

U.S. PATENT DOCUMENTS

| | | | |
|---|---|---|---|
| 7,123,277 B2 | 10/2006 | Brown Elliott et al. | |
| 7,274,383 B1 | 9/2007 | Brown Elliot | |
| 8,681,174 B2* | 3/2014 | Nam .................. | H04N 13/0404 345/419 |
| 9,202,305 B2* | 12/2015 | Nakamura .............. | G06T 15/06 |
| 2007/0058034 A1* | 3/2007 | Numazaki .......... | H04N 13/0404 348/51 |
| 2011/0242289 A1* | 10/2011 | Fukushima ............. | G06T 15/20 348/51 |
| 2012/0169724 A1* | 7/2012 | Park ................... | H04N 13/0011 345/419 |
| 2013/0135299 A1* | 5/2013 | Park ....................... | G06T 15/00 345/419 |
| 2014/0118512 A1 | 5/2014 | Park et al. | |

(Continued)

FOREIGN PATENT DOCUMENTS

| | | |
|---|---|---|
| CN | 101803395 A | 8/2010 |
| EP | 2 728 888 A2 | 5/2014 |
| JP | 2010-220186 A | 9/2010 |

(Continued)

OTHER PUBLICATIONS

Principlal Observation Ray calibration for tiled-lens-array integral imaging display; Li' 2013.*

(Continued)

*Primary Examiner* — Luis Perez Fuentes
(74) *Attorney, Agent, or Firm* — Harness, Dickey & Pierce, P.L.C.

(57) ABSTRACT

An image processing method and apparatus for a three-dimensional (3D) display device that may process image data for a first panel to generate an image for a second panel based 3D display device, is provided.

24 Claims, 40 Drawing Sheets

(56) References Cited

U.S. PATENT DOCUMENTS

2014/0132711 A1* 5/2014 Brown Elliott .... H04N 13/0007
348/43

FOREIGN PATENT DOCUMENTS

| KR | 10-2007-0017350 A | 2/2007 |
| KR | 10-2011-0026225 A | 3/2011 |
| KR | 10-2013-0061042 A | 6/2013 |
| KR | 10-2013-0070303 A | 6/2013 |
| KR | 10-2013-0014459 A | 10/2013 |
| KR | 10-2014-0056748 A | 5/2014 |
| WO | WO-02091349 A1 | 11/2002 |

OTHER PUBLICATIONS

Direct recovery of three-dimensional scene geometry from binocular steroe disparity; Wildes; 1991.*
Google search log for NPL.*
Lanman, D. et al., "Near-eye light field displays," pp. 1-10, Nov. 1, 2013.
Levoy, M. et al., "Light Field Rendering," pp. 1-12, Jul. 1, 1996.
Extended European Search Report dated Jan. 20, 2016.
Chinese Office Action and English translation thereof dated Nov. 1, 2017.

* cited by examiner

FIG. 2
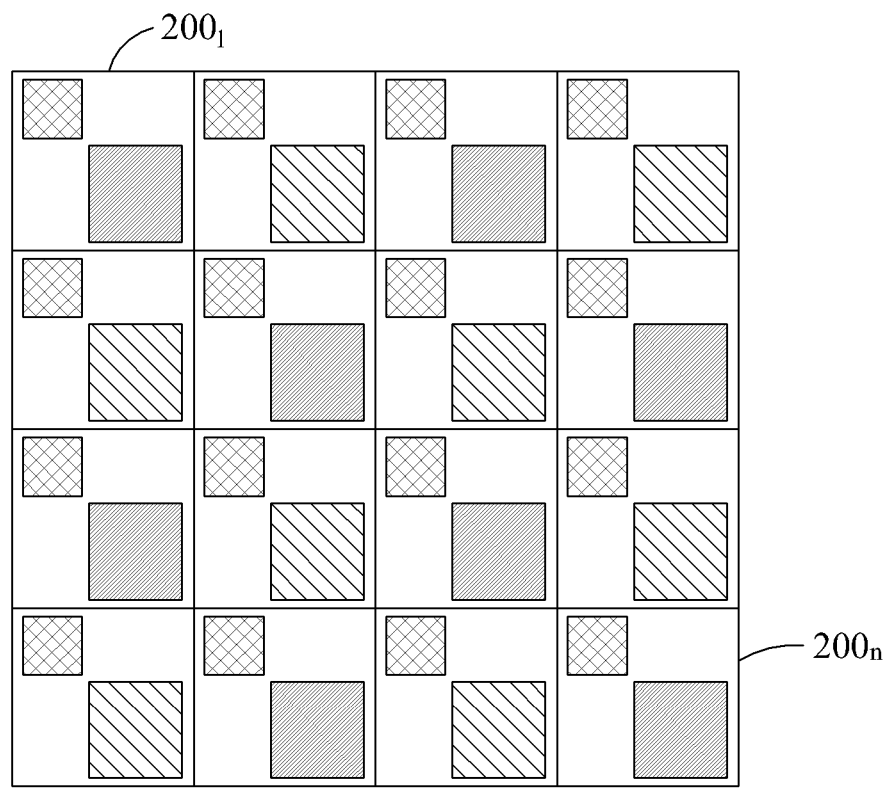
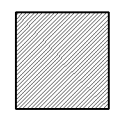 R SUBPIXEL
 G SUBPIXEL
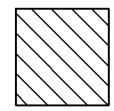 B SUBPIXEL

FIG. 3
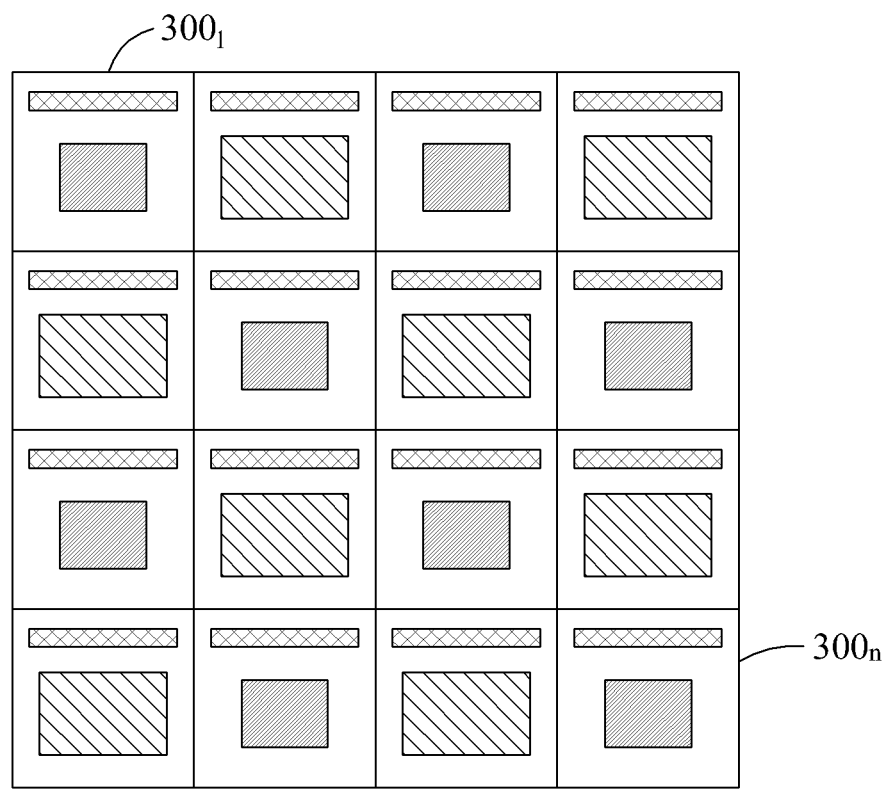
 R SUBPIXEL
 G SUBPIXEL
 B SUBPIXEL

FIG. 15

| | | | | | | | | |
|---|---|---|---|---|---|---|---|---|
| | R10,G10, B10 | R11,G11, B11 | R12,G12, B12 | R13,G13, B13 | R14,G14, B14 | | | |
| | R25,G25, B25 | R2,G2, B2 | R3,G3, B3 | R4,G4, B4 | R15,G15, B15 | | | |
| | R24,G24, B24 | R5,G5, B5 | R1,G1, B1 | R6,G6, B6 | R16,G16, B16 | | | |
| | R23,G23, B23 | R7,G7, B7 | R8,G8, B8 | R9,G9, B9 | R17,G17, B17 | | | |
| | R22,G22, B22 | R21,G21, B21 | R20,G20, B20 | R19,G19, B19 | R18,G18, B18 | | | |

1400, 1411, 1510

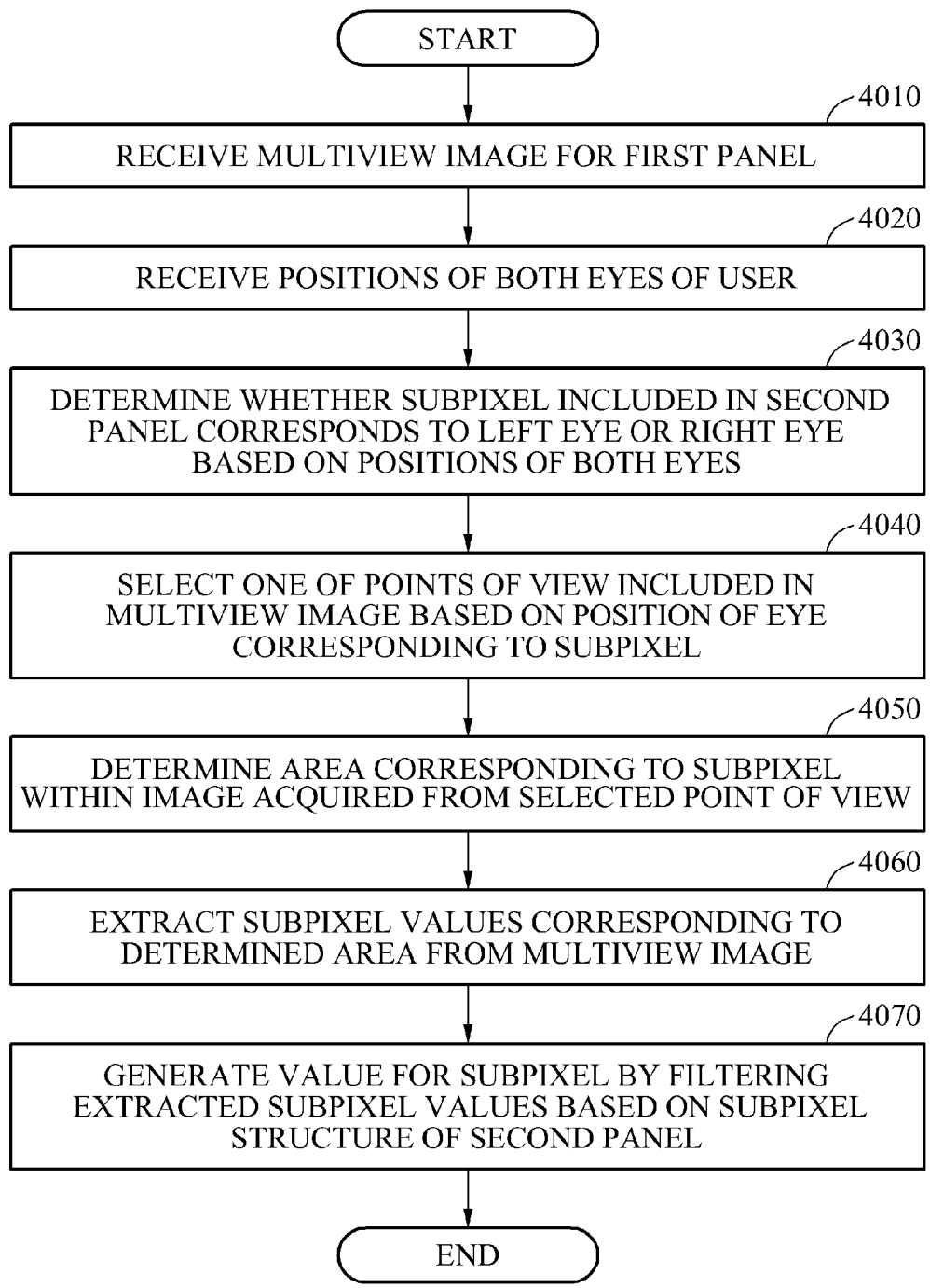

IMAGE PROCESSING METHOD AND APPARATUS

CROSS-REFERENCE TO RELATED APPLICATION

This application claims the priority benefit of Korean Patent Application No. 10-2014-0107172, filed on Aug. 18, 2014, in the Korean Intellectual Property Office, the entire contents of which are incorporated herein by reference in its entirety.

BACKGROUND

1. Field

Example embodiments relate to an image processing method and apparatus, such as an image processing method and apparatus for a three-dimensional (3D) display device.

2. Description of Related Art

Many currently commercialized 3D display devices employ a principle in which a depth effect is provided by displaying different images to both eyes of a user. However, in such a method, only binocular disparity information may be provided to the user, and monocular depth perception factors, for example, focus adjustment and motion parallax, may not be transmitted. Thus, a 3D image may not be natural and cause eye fatigue.

Technologies that display a natural 3D image without causing fatigue and 3D display technologies that display a spatio-angular distribution of rays, for example, a light field, may be used. Here, the light field may refer to a distribution of rays from an object with respect to positions or directions. When such a light field is optically displayed on a plane, a user positioned behind the plane may experience a ray distribution similar to a case in which an actual object is provided and thus, may view a natural 3D image of an object.

SUMMARY

At least some example embodiments relate to an image processing method.

In at least some example embodiments, the image processing method includes receiving image data for a first panel, and processing the image data based on an optical characteristic of a second panel and a subpixel structure of a plurality of subpixels in the second panel, the second panel being configured for a 3D display device. The first panel may be a red, green, and blue (RGB) stripe panel, and the second panel is different from the RGB stripe panel.

The optical characteristic comprises a characteristic associated with a ray direction of a subpixel in the second panel. The optical characteristic is based on at least one of a distance between the second panel and an optical layer, a position of at least one of the subpixels in the second panel, and a position of an optical element through with respect to light output by the at least one subpixel with the optical element being in the optical layer.

The subpixel structure of the second panel comprises at least one of colors of the subpixels in the second panel, each subpixel associated with a color, an arrangement of the subpixels in the second panel based on the colors, sizes of the subpixels of each color in the second panel, and a number of the subpixels of each color in the second panel.

If the image data includes a multiview image for the first panel, the processing comprises obtaining a point of view corresponding to a selected subpixel of the plurality of pixels in the second panel based on the optical characteristic, obtaining an area corresponding to the selected subpixel within an image from the point of view based on the optical characteristic, the area including neighboring subpixels around the selected subpixel, extracting first panel subpixel values of the selected subpixel and the neighboring subpixels based on multiview image, and generating a second panel value for the selected subpixel by filtering the extracted first panel subpixel values based on the subpixel structure of the second panel.

The obtaining the point of view obtains the point of view from a table and the obtaining the area obtains the area from the table.

The obtaining the point of view comprises selecting one of a plurality of points of view in the multiview image based on a ray direction of the selected subpixel, and determining a position corresponding to the selected subpixel from the selected point of view based on a camera parameter for the multiview image.

The camera parameter comprises at least one of an angle of view of a camera for each of the plurality of points of view, a photographing direction of the camera for each of the plurality of points of view, and a distance between a subject and the camera for each of the plurality of points of view.

The extracted values are first subpixel values of neighboring pixels having a same color as the selected pixel.

The obtaining the point of view determines a plurality of points of view and the obtaining the area obtains a plurality of areas corresponding to the selected subpixel at the plurality of points of view if the subpixel corresponds to a plurality of points of view and each of the plurality of areas including neighboring subpixels around the selected subpixel, the determined area being one of the plurality of areas.

The extracting comprises extracting first panel subpixel values of neighboring subpixels having a same color as the selected subpixel in each of the plurality of areas, and interpolating the first panel subpixel values between the plurality of areas.

The generating comprises obtaining weights for the extracted first panel subpixel values based on the subpixel structure, and calculating the second panel value for the selected subpixel by performing a weighted summation on the extracted first panel subpixel values using the weights.

The method further comprising obtaining positions of both eyes of a user, and determining whether the selected subpixel corresponds to a left eye or a right eye based on the positions of the eyes. The determining the area comprises selecting one of a plurality of points of view in the multiview image based on the position of the eye corresponding to the selected subpixel, and determining a position corresponding to the selected subpixel from the selected point of view based on a camera parameter for the multiview image.

If the image data includes a 3D model, the processing comprises obtaining a point of view corresponding to a selected subpixel in the second panel based on the optical characteristic and obtaining an area corresponding to the selected subpixel within an image from the point of view based on the optical characteristic, the area including neighboring subpixels around the selected subpixel, generating first panel subpixel values of the selected subpixel and the neighboring subpixels based on the 3D model, and generating a second panel value for the selected subpixel by filtering the generated first panel subpixel values based on the subpixel structure of the second panel.

The obtaining the point of view obtains the point of view from a table and the obtaining the area obtains the area from the table.

The obtaining the point of view comprises determining the point of view based a ray direction of the selected subpixel from which the 3D model is view, and determining a position corresponding to the selected subpixel from the determined point of view based on a position at which a light propagated in the ray direction is incident to a virtual camera for the determined point of view.

The generated first panel values are subpixel values of neighboring pixels having a same color as the selected pixel.

The generating comprises obtaining weights for the generated first panel subpixel values based on the subpixel structure and calculating the second panel value for the subpixel by performing a weighted summation on the generated first panel subpixel values using the weights.

If the image data includes a stereoscopic image for the first panel, the method further comprises receiving positions of both eyes of a user, and the processing includes determining whether a selected subpixel in the second panel corresponds to a left image or a right image based on the positions of the eyes, extracting first panel subpixel values in an area corresponding to the selected subpixel from the image corresponding to the selected subpixel, and generating a second panel value for the selected subpixel by filtering the extracted first panel subpixel values based on the subpixel structure of the second panel.

The selected subpixel corresponds to the left image when a light propagated in a ray direction of the subpixel reaches a position closer to a left eye of the user than a right eye of the user, and the selected subpixel corresponds to the right image when the light reaches a position closer to the right eye of the user than the left eye of the user.

The extracted first panel subpixel values are subpixel values of neighboring pixels having a same color as the selected pixel.

The generating comprises obtaining weights for the extracted first panel subpixel values based on the subpixel structure and calculating the second panel value for the selected subpixel by performing a weighted summation on the extracted first panel subpixel values using the weights.

At least other example embodiments relate to an image processing apparatus.

In at least some example embodiments, an image processing apparatus comprising a receiver configured to receive image data for a first panel, and a processor configured to process the image data based on an optical characteristic of a second panel and a subpixel structure of a plurality of subpixels in the second panel, the second panel being configured for a 3D display device.

At least one example embodiment discloses a method of generating a subpixel value of a selected subpixel in a first panel, the first panel having a first subpixel structure. The method includes obtaining image data associated with a second panel, the second panel having a second subpixel structure and processing the image data by transforming at least a portion of the image data into the subpixel value of the selected subpixel based on a point of view corresponding to the selected subpixel, the first subpixel structure being different than the second subpixel structure.

In an example embodiment, the processing includes determining the point of view corresponding to the selected subpixel based on the image data, the point of view being associated with an image and determining an area corresponding to the selected subpixel in the image, the subpixel value being based on the area.

In an example embodiment, the processing includes determining subpixel values of second panel subpixels based on the area and determining the subpixel value of the selected subpixel based on the subpixel values of the second panel subpixels.

In an example embodiment, the second panel subpixels surround the selected subpixel.

In an example embodiment, the first panel is configured for a three-dimensional (3D) display device.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIGS. 1 through 7 illustrate an image processing apparatus according to at least some example embodiments;

FIGS. 14 and 15 illustrate an area determining operation according to at least some example embodiments;

FIGS. 37 through 40 illustrate a light field rendering apparatus and method according to at least some example embodiments.

DETAILED DESCRIPTION

Figure 1:
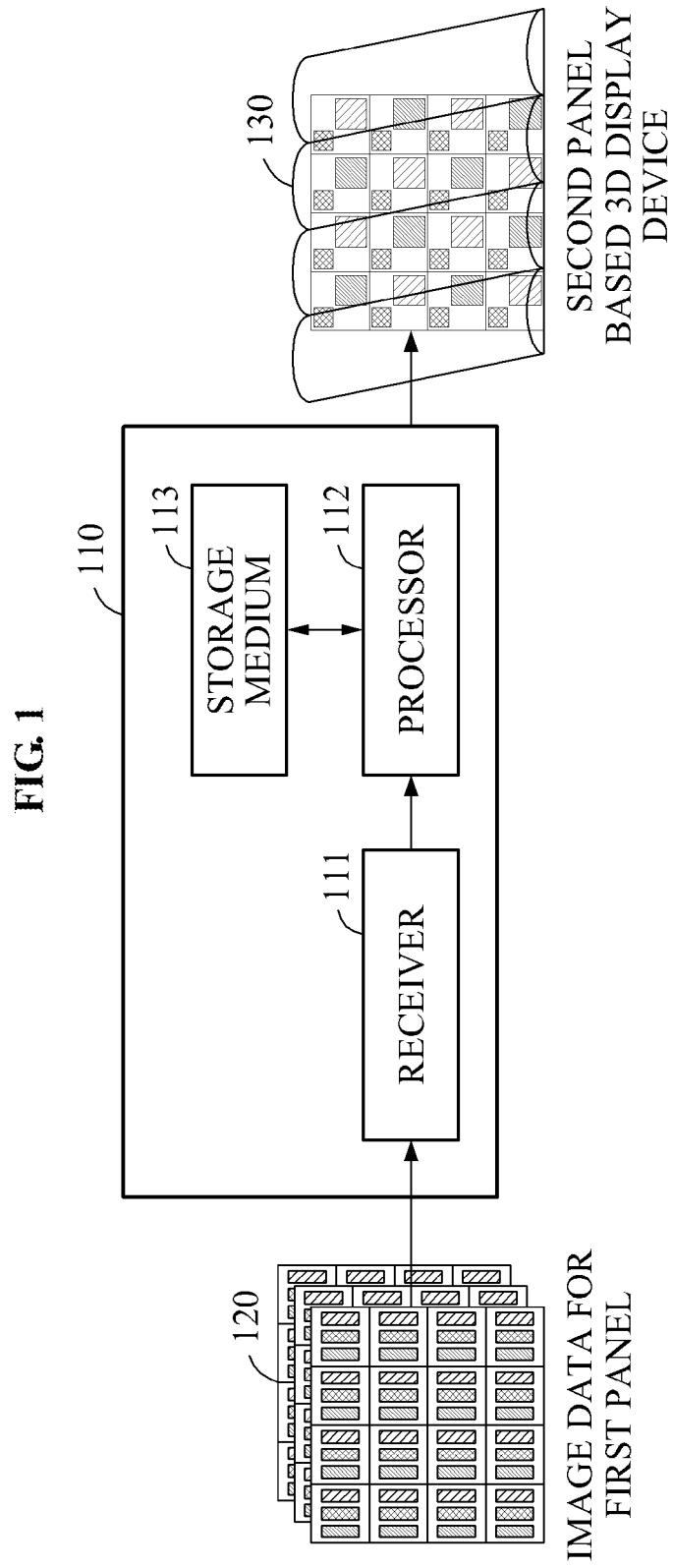

Hereinafter, at least some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing example embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which at least some example embodiments are shown. In the drawings, the thicknesses of layers and regions may be exaggerated for clarity.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., nonvolatile memories universal flash memories, universal flash memory controllers, nonvolatile memories and memory controllers, digital point-and-shoot cameras, personal digital assistants (PDAs), smartphones, tablet personal computers (PCs), laptop computers, etc.). The units and/or modules described herein may be implemented using hardware components and hardware components executing software components. Such existing hardware may include one or more Central Processing Units (CPUs), digital signal processors (DSPs), application-specific-integrated-circuits (ASICs), field programmable gate arrays (FPGAs) computers or the like, which may be referred to as processing devices A processing device may be implemented using one or more hardware device configured to carry out and/or execute program code by performing arithmetical, logical, and input/output operations. The processing device may run an operating system (OS) and one or more software applications that run on the OS. The processing device also may access, store, manipulate, process, and create data in response to execution of the software. For example, a processing device may include multiple processors or a processor and a controller. In addition, different processing configurations are possible, such a parallel processors.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium", "non-transitory computer-readable media" or "non-transitory computer readable storage medium" may represent one or more devices for storing data, including read only memory (ROM), random access memory (RAM), resistive RAM, memristors, magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The software may include a computer program, a piece of code (code segment), an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments to be described below may be used for rendering in relation to a light field display technique. The light field display technique refers to an autostereoscopic technique that displays a three-dimensional (3D) image, and may be applicable to, for example, a 3D television, a 3D monitor, a 3D digital information display (DID), and a 3D mobile device, for example.

FIGS. 1 through 7 illustrate an image processing apparatus according to at least some example embodiments. The image processing apparatus refers to an apparatus that processes images using a light field display technique, and may include, for example, a light field rendering apparatus. Hereinafter, for ease of description, the image processing apparatus will also be referred to as a light field rendering apparatus.

Referring to FIG. 1, a light field rendering apparatus 110 according to an example embodiment may include a receiver 111 and a processor 112. The receiver 111 may receive image data 120 for a first panel. In an example, the image data 120 for the first panel may include a multiview image for the first panel.

The processor 112 may process the image data 120 for the first panel to generate an image for a second panel based 3D display device 130. The second panel based 3D display device 130 refers to an apparatus that displays a 3D image using a light field display technique, and may include, for example, a second panel based light field display device. Hereinafter, for ease of description, the second panel based 3D display device 130 will also be referred to as a second panel based light field display device.

The processor 112 may generate the image for the second panel based light field display device 130 by processing the image data 120 for the first panel based on an optical characteristic of the second panel based 3D display device 130 and a sub pixel structure of a second panel. The subpixel structure of the second panel may be different than the subpixel structure of the first panel. The optical characteristic of the second panel based 3D display device 130 may include a characteristic associated with a ray direction of a subpixel included in the second panel.

In detail, the light field rendering apparatus 110 may generate subpixel values of the second panel included in the second panel based light field display device 130 using the multiview image for the first panel. The light field rendering apparatus 110 may be configured using various modules configured to render a light field, and the various modules constituting the light field rendering apparatus 110 may be implemented as hardware modules, hardware executing software modules, or a combination thereof. The hardware executing software modules may be at least one processor.

A subpixel structure of the first panel may differ from the subpixel structure of the second panel. A subpixel structure of a predetermined and/or desired panel may include colors of subpixels included in the panel, a form in which subpixels of each color are disposed in the panel, sizes of subpixels of each color included in the panel, and a number of subpixels of each color included in the panel.

For example, the first panel may be a general red, green, and blue (RGB) panel, and the second panel may be a PenTile™ panel. A subpixel structure of the general RGB panel may differ from a subpixel structure of the PenTile™ panel. In detail, the general RGB panel may have a subpixel structure in which a red (R) subpixel, a green (G) subpixel, and a blue (B) subpixel having identical sizes are included in a single pixel. For example, the general RGB panel may be implemented in a RGB stripe structure.

The PenTile™ panel may not have a subpixel structure in which an R subpixel, a G subpixel, and a B subpixel having identical sizes are included in a single pixel. The PenTile™ panel may be implemented in various forms. In an example, the PenTile™ panel may have a subpixel structure as shown in FIG. 2. The subpixel structure of FIG. 2 may be referred to as a diamond PenTile™ structure. FIG. 2 illustrates a plurality of pixels $200_1$-$200_n$ having a diamond PenTile™ subpixel structure. Referring to FIG. 2, a single pixel (e.g., pixel $200_1$) may include two subpixels. Each pixel may not include all of an R subpixel, a G subpixel, and a B subpixel. Each pixel may include an R subpixel and a G subpixel, or include a B subpixel and a G subpixel. A size of the G subpixel may be smaller than a size of the R subpixel and a size of the B subpixel. A G subpixel and an R subpixel may be disposed in a diagonal direction within a single pixel. Also, a G subpixel and a B subpixel may be disposed in a diagonal direction within a single pixel. A disposition of subpixels within a single pixel may be changed variously. Further, respective sizes and forms of an R subpixel, a G subpixel, and a B subpixel may be changed variously.

In another example, the PenTile™ panel may have a subpixel structure as shown in FIG. 3. FIG. 3 illustrates a plurality of pixels $300_1$-$300_n$ having another PenTile™ subpixel structure. Referring to FIG. 3, a single pixel (e.g., pixel $300_1$) may include two subpixels. Each pixel may not include all of an R subpixel, a G subpixel, and a B subpixel. Each pixel may include an R subpixel and a G subpixel, or include a B subpixel and a G subpixel. The R subpixel, the G subpixel, and the B subpixel may have different sizes. A G subpixel and an R subpixel may be disposed in a vertical direction within a single pixel. Also, a G subpixel and a B subpixel may be disposed in a vertical direction within a single pixel. A disposition of subpixels within a single pixel may be changed variously. Further, respective sizes and forms of an R subpixel, a G subpixel, and a B subpixel may be changed variously.

Figure 4:
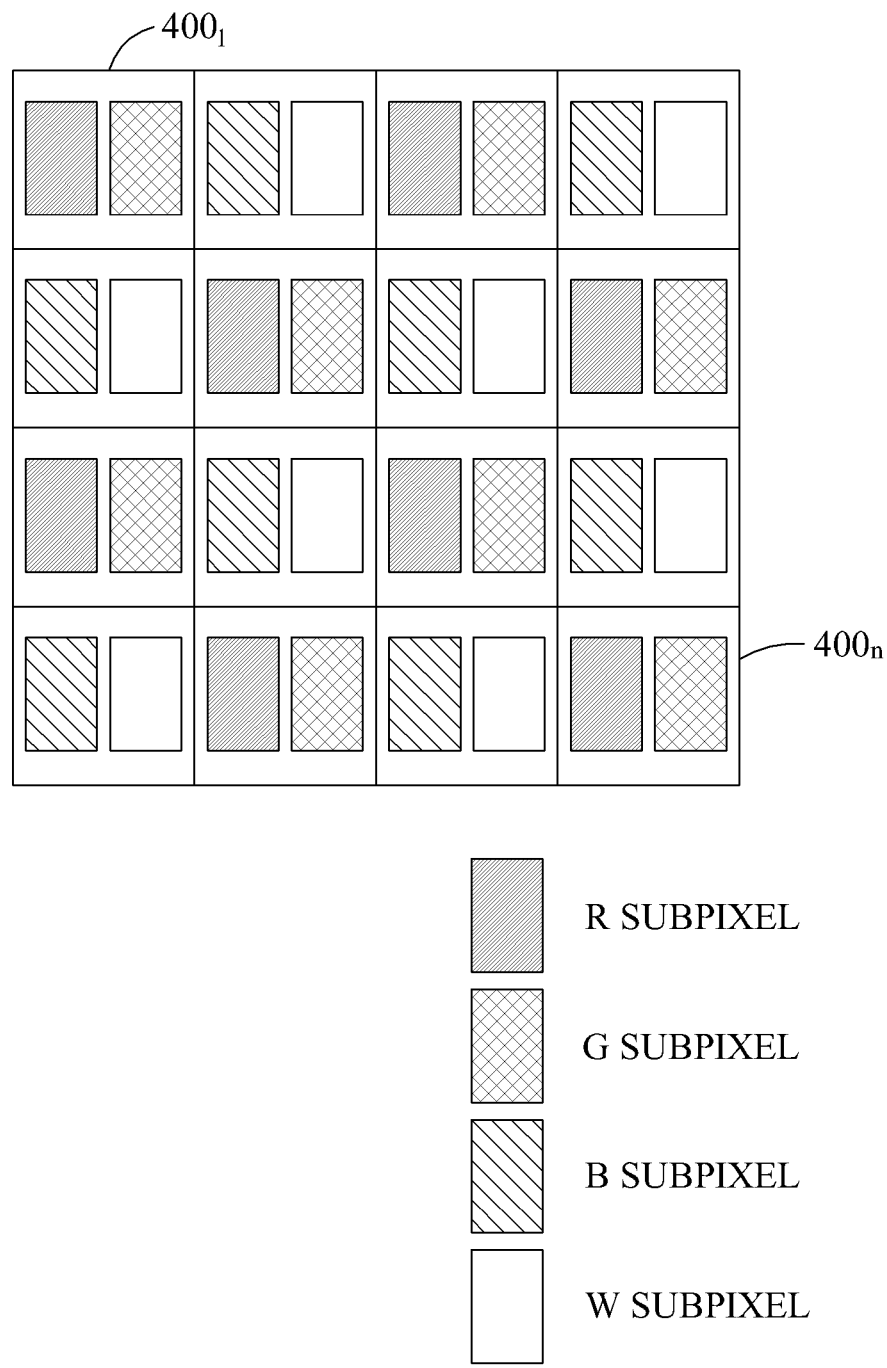
Figure 5:
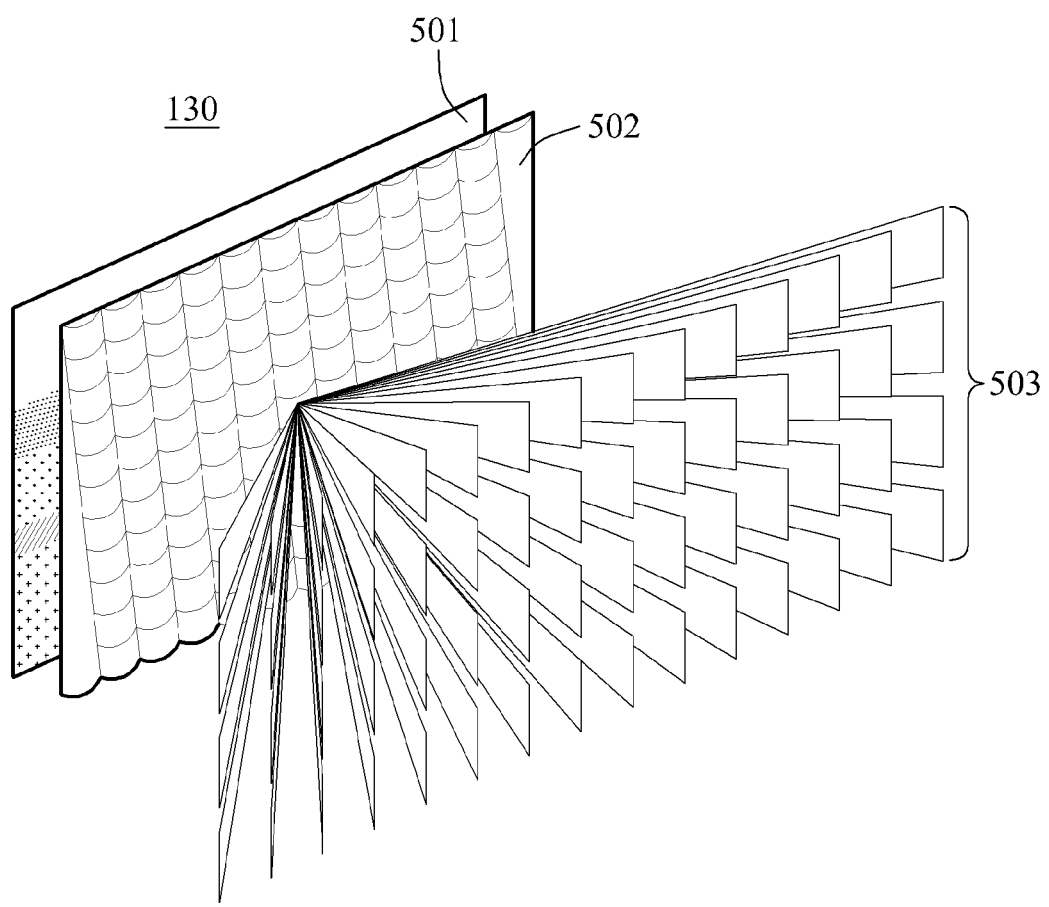

In still another example, the PenTile™ panel may have a subpixel structure as shown in FIG. 4. FIG. 4 illustrates a plurality of pixels $400_1$-$400_n$ having another PenTile™ subpixel structure. Referring to FIG. 4, the PenTile™ panel may further include white (W) subpixels, in addition to R subpixels, G subpixels, and B subpixels. Each pixel may not include all of an R subpixel, a G subpixel, a B subpixel, and a W subpixel. Each pixel may include an R subpixel and a G subpixel, or include a B subpixel and a W subpixel. A G subpixel and an R subpixel may be disposed in a horizontal direction within a single pixel. Also, a B subpixel and a W subpixel may be disposed in a horizontal direction within a single pixel. A disposition of subpixels within a single pixel may be changed variously. Further, respective sizes and forms of an R subpixel, a G subpixel, a B subpixel, and a W subpixel may be changed variously.

Although a case in which the second panel corresponds to a PenTile™ panel has been described above for ease of description, the second panel may be a panel having a structure differing from that of the general RGB panel, not limited to a PenTile™ panel.

The light field rendering apparatus 110 may render a light field by generating the subpixel values of the second panel included in the second panel based light field display device 130 using the multiview image for the first panel. For example, referring to FIG. 5, the second panel based light field display device 130 may express lights output from points present in a predetermined and/or selected space in various directions. The second panel based light field display device 130 may use a principle in which an actual object generates or reflects lights at a single point in various directions.

The second panel based light field display device 130 may include a second panel 501 including subpixels, and an optical layer 502 through which lights output from the subpixels pass. The optical layer 502 may include an optical filter, for example, a lenticular lens, a parallax barrier, a lens array, and a micro lens array. Further, the optical layer 502 may include a directional backlight unit. Hereinafter, for ease of description, a case in which the optical layer 502 corresponds to a lens array will be described. However, example embodiments are not limited to the aforementioned optical filter. Various types of optical layers that may be disposed on a front surface or a rear surface of a display may be used.

A direction of a light output from a subpixel included in the second panel 501 may be determined through the optical layer 502. A light output from each subpixel may pass through the optical layer 502 and be radiated in a predetermined and/or desired direction. Through such a process, the second panel based light field display device 130 may display a stereoscopic image or a multiview image.

The optical layer 502 may include a plurality of elements. Each element may be referred to as a 3D pixel. A single 3D pixel may output rays including different pieces of information in various directions. For example, a single 3D pixel included in the optical layer 502 may output rays 503 in 15×4 directions. The second panel based light field display device 130 may express points in a 3D space using the plurality of 3D pixels.

In this example, positions and/or sizes of subpixels within the second panel 501 may change based on a subpixel structure of the second panel 501. Thus, a direction of a ray output from each subpixel within the second panel 501 may change based on the subpixel structure of the second panel 501. Accordingly, when subpixel values of the multiview image for the first panel are determined to be subpixel values of the second panel 501, the multiview image may not be displayed appropriately. For example, when a panel image on which light field rendering is performed based on a subpixel structure of a general RGB panel is simply converted to be suitable for a subpixel structure of a PenTile™ panel, a point at which a ray direction of a subpixel is changed based on the subpixel structure of the PenTile™ panel may be ignored and thus, an intended image may not be displayed appropriately.

The light field rendering apparatus 110 may provide a rendering technique for a light field display device using a second panel having a different subpixel structure. For example, the light field rendering apparatus 110 may generate a value for a subpixel of the second panel from the multiview image for the first panel based on the subpixel structure of the second panel. An operation of the light field rendering apparatus 110 will be described in detail later.

Accordingly, at least some example embodiments may provide technology that implements a light field display device using various panels. As will be described in detail later, the light field rendering apparatus 110 may provide an algorithm that performs a subpixel structure conversion only with respect to a subpixel to be used actually in the second panel based light field display device 130 to minimize an operation of converting a subpixel structure to be suitable for the subpixel structure of the second panel.

Figure 6:
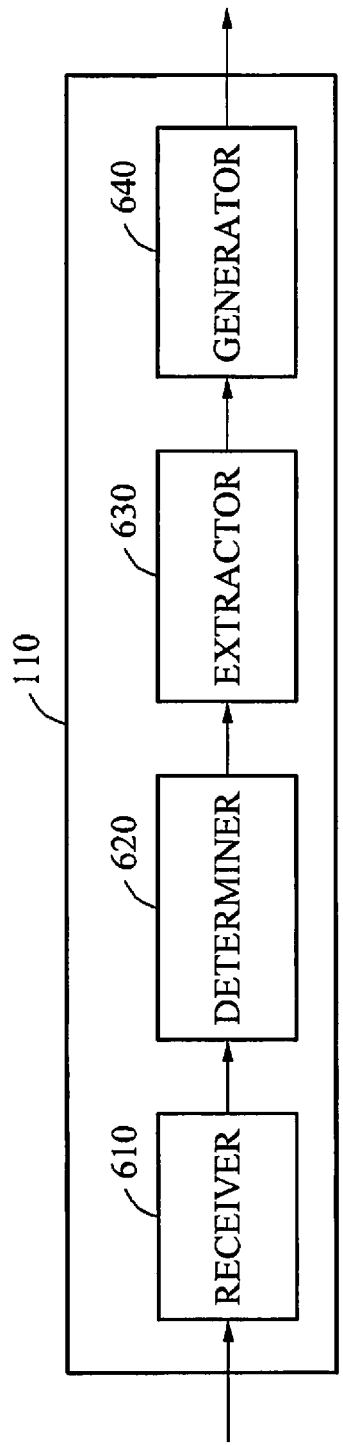

Referring to FIG. 6, the light field rendering apparatus 110 may include a receiver 610, a determiner 620, an extractor 630, and a generator 640. The receiver 610 may receive image data for a multiview image for a first panel. The receiver 610 may correspond to the receiver 111 of FIG. 1. The determiner 620 may determine a point of view corresponding to a subpixel included in a second panel based on the multiview image, and an area corresponding to the subpixel from the point of view. The extractor 630 may extract subpixel values corresponding to the determined point of view and the determined area from the multiview image. The generator 640 may generate a value for the subpixel by filtering the extracted subpixel values based on a subpixel structure of the second panel. The determiner 620, the extractor 630, and the generator 640 may correspond to the processor 112 of FIG. 1.

The determiner 620, the extractor 630, and the generator 640 may be hardware, firmware, hardware executing software or any combination thereof. When at least one of the determiner 620, the extractor 630, and the generator 640 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the determiner 620, the extractor 630, and the generator 640. As stated above, CPUs, DSPs, ASICs and FPGAs may generally be referred to as processing devices.

In the event where at least one of the determiner 620, the extractor 630, and the generator 640 is a processor executing software, the processor 112 is configured as a special purpose machine to execute the software, stored in a storage medium 113, to perform the functions of the at least one of the determiner 620, the extractor 630, and the generator 640.

Figure 7:
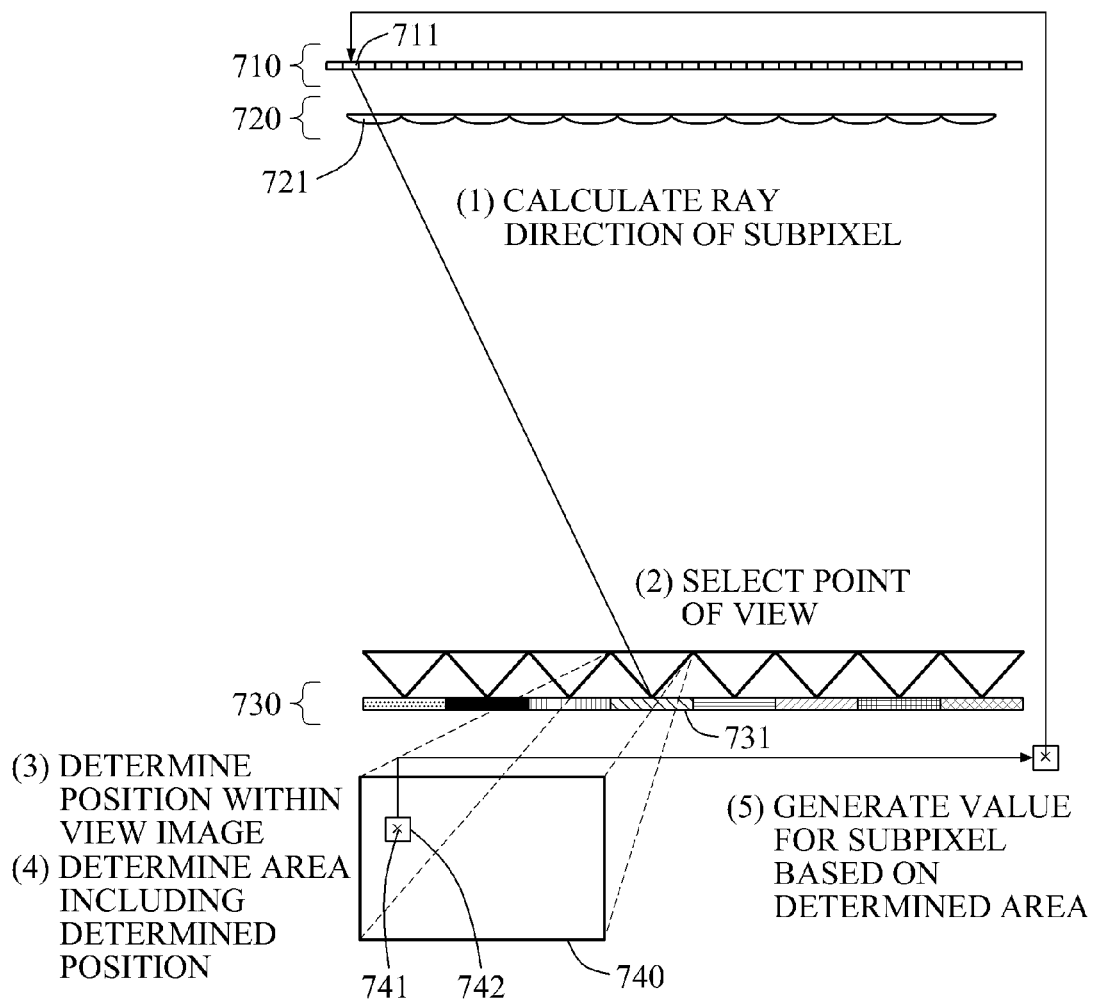

The determiner 620 may determine the point of view corresponding to the subpixel, and the area corresponding to the subpixel based on a ray direction of the subpixel. Referring to FIG. 7, the determiner 620 may calculate a ray direction of a subpixel 711 to render a value for the subpixel 711. For example, a light output from the subpixel 711 may be propagated in a direction passing through a center of an element 721 within an optical layer 720. The determiner 620 may calculate the ray direction of the subpixel 711 based on a distance between a second panel 710 and the optical layer 720, a position of the subpixel 711 within the second panel 710, and a position of the element 721 through which the light output from the subpixel 711 passes, among elements within the optical layer 720. Hereinafter, a light output from a subpixel may include both a light output from a subpixel that independently emits a light, similar to a light emitting diode (LED), and a light output from a subpixel that transmits a light of a backlight, similar to a liquid crystal display (LCD).

The light propagated in the ray direction of the subpixel 711 may correspond to one of points of view 730 of the multiview image. The multiview image may include view images corresponding to a plurality of points of view. The determiner 620 may select a point of view 731 corresponding to a position that the light propagated in the ray direction of the subpixel 711 reaches. A point of view selecting operation will be described in detail with reference to FIGS. 8 and 9.

The determiner 620 may determine a position 741 corresponding to a subpixel within an image 740 acquired from the selected point of view 731, based on a camera parameter for the multiview image. The camera parameter refers to a parameter of a multiview camera used to photograph the multiview image, and may include, for example, an angle of view of a camera for each point of view, a photographing direction of the camera for the each point of view, and a distance between a subject and the camera for the each point of view. The camera parameter may be included in the multiview image, and the determiner 620 may obtain the camera parameter from the multiview image. A position determining operation will be described in detail with reference to FIGS. 10 through 13.

The determiner 620 may determine an area 742 including the position 741 within the image 740 acquired from the selected point of view 731 to be an area corresponding to the subpixel 711. The area 742 may be an area of a predetermined and/or selected size including the position 741 at a center of the area 742 within the image 740. An area determining operation will be described in detail with reference to FIGS. 14 through 15.

In the foregoing operation, the determiner 620 may determine a point of view corresponding to a subpixel and an area corresponding to the subpixel based on a ray direction of the subpixel. However, in other example embodiments, the determiner 620 may obtain the point of view corresponding to the subpixel and the area corresponding to the subpixel from a pre-provided table. For example, when conditions for photographing a multiview image, for example, a photographing distance of the multiview image, a photographing angle of view of the multiview image, a photographing direction of the multiview image, and a camera parameter for the multiview image, are standardized, a point of view corresponding to a predetermined and/or selected subpixel and an area corresponding to the predetermined and/or selected subpixel may be predetermined and/or selected.

The pre-provided table may store information related to points of view and areas corresponding to subpixels included in a second panel, based on a subpixel structure of the second pixel. In an example, the determiner 620 may determine the point of view corresponding to the subpixel and the area corresponding to the subpixel by referring to the pre-provided table.

The table may be configured to store pre-calculated area information of the RGB panel to be filtered to obtain values of subpixels and points of view expressed by the subpixels, with respect to all the subpixels. When a multiview image is an input, viewpoint information stored in the table may be viewpoint values indicating viewpoints. When 3D model data is used, the viewpoint information stored in the table may be a position of a center of a virtual camera designated to render the 3D model data, a viewing direction of the camera, and a field of view of the camera.

Further, area information within a view image to be filtered to obtain values of subpixels of the Pentile™ panel based on a resolution of the corresponding view image may also be stored in the table. A number of storage spaces in the table may correspond to the number of subpixels. The viewpoint information or virtual camera information, a position in a view image to be used for filtering, and range information may be stored in each storage space. The stored information may be retrieved and used to calculate values of subpixels of the Pentile™ panel.

When an input image has the same format, viewpoint information and area information for filtering may not have to be calculated each time based on directions and positions of subpixels. Thus, such information may be calculated once, stored, and identically applied to subsequent information to be continuously input.

The virtual camera refers to a camera, which is not real, having information about a position, a direction, and a field of view of a camera to be used for 2D rendering of a 3D model The camera information may vary in various forms as long as the camera information indicates that a center of projection of the camera may be positioned on a line extending a direction of light expressed by a subpixel, and the direction of the light expressed by the subpixel is included in a field of view. However, for convenience, constraints that an up vector of the corresponding virtual camera is the same as a vertical direction of a display and faces an upper side, or that a direction of the center of a field of view of the virtual camera, that is, a projection direction, is perpendicular to a plane of the display may be set in advance.

The virtual camera may be set to capture ray information of a direction matching light emitted from the corresponding subpixel.

Referring back to FIG. 7, the extractor 630 may extract subpixel values corresponding to the point of view 731 and the area 742 from the multiview image. For example, the extractor 630 may detect a view image corresponding to the point of view 731, among a plurality of view images constituting the multiview image. The extractor 630 may extract values of subpixels included in the area 742 from the detected view image.

In this example, the extractor 630 may selectively extract values of subpixels of a color identical to a color of the subpixel 711, among the subpixels included in the area 742. For example, the subpixel 711 may be an R subpixel, and the area 742 may include R subpixels, G subpixels, and B subpixels. The extractor 630 may selectively extract values of the R subpixels, among the R subpixels, the G subpixels, and the B subpixels within the area 742.

The generator 640 may generate a value for the subpixel 711 based on the area 742. The generator 640 may generate the value for the subpixel 711 by filtering the subpixel values extracted from the area 742. For example, the generator 640 may determine weights based on the subpixel structure of the second panel 710. The generator 640 may calculate the value for the subpixel 711 by performing a weighted summation on the subpixel values extracted from the area 742, using the determined weights. The calculated value may be applied to the subpixel 711. A filtering operation will be described in detail with reference to FIGS. 16 through 23.

Figure 8:
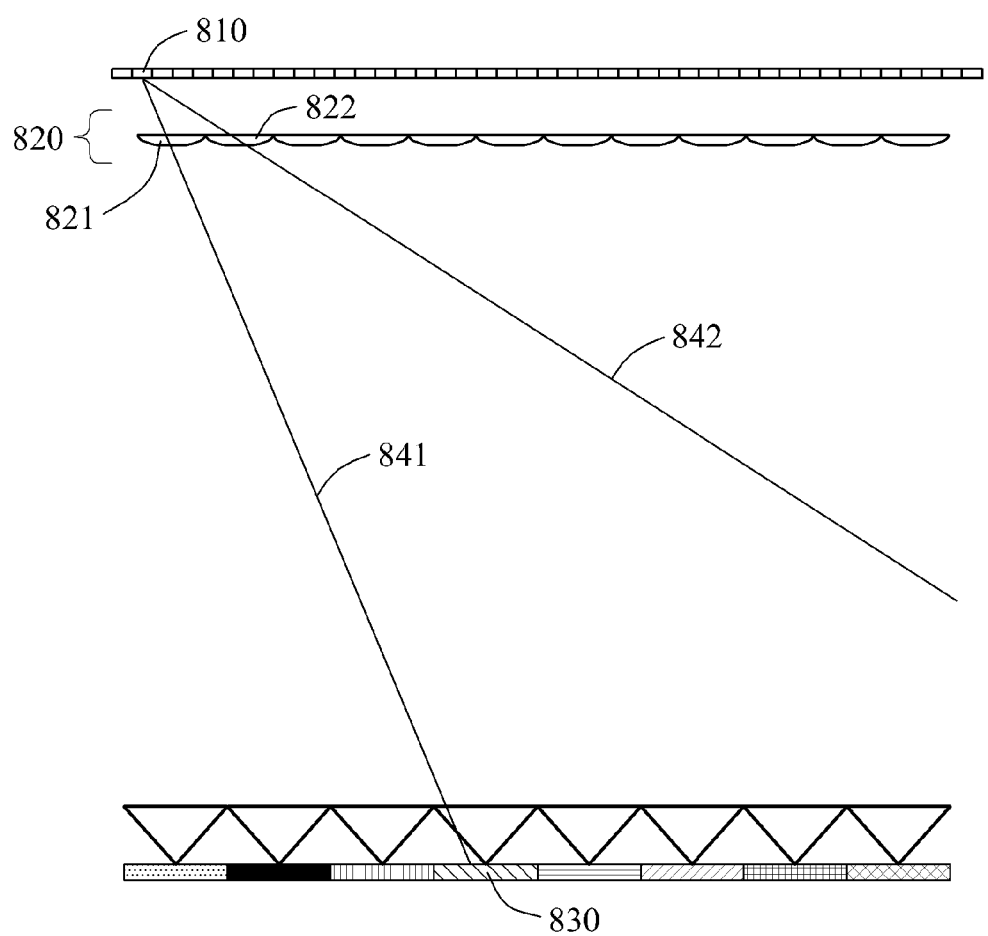
FIGS. 8 and 9 illustrate a point of view selecting operation according to at least some example embodiments.
Figure 9:
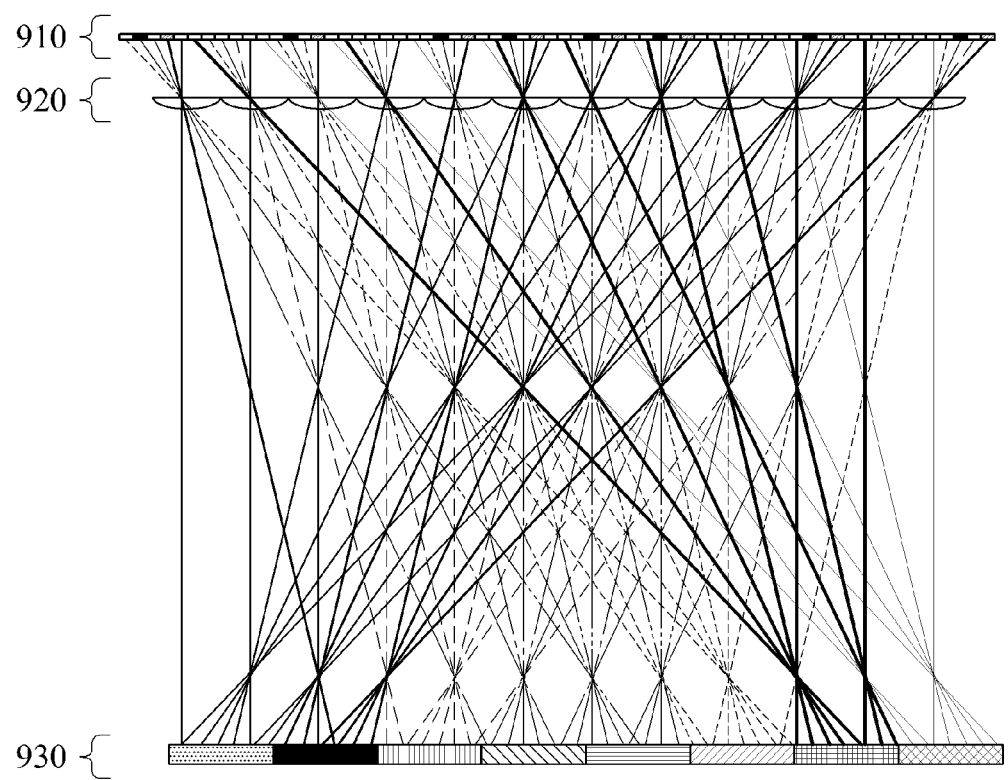

FIGS. 8 and 9 illustrate a point of view selecting operation according to at least some example embodiments.

Referring to FIG. 8, a subpixel 810 may output lights in various directions, and the output lights may pass through an optical layer 820 and be expressed in a form in which ray directions are quantized. For example, directions of the lights output from the subpixel 810 may be quantized as directions passing through respective centers of elements included in the optical layer 820.

The determiner 620 may determine ray directions corresponding to points of view constituting a multiview image, among the quantized ray directions, to be ray directions of the subpixel 810. For example, a first ray direction 841 may correspond to a point of view 830, among the points of view constituting the multiview image, and a second ray direction 842 may not correspond to any of the points of view constituting the multiview image. The first ray direction 841 may be a direction in which a light output from the subpixel 810 passes through a center of an element 821, and the second ray direction 842 may be a direction in which a light output from the subpixel 810 passes through a center of an element 822. In this example, the determiner 620 may determine the first ray direction 841 to be a ray direction of the subpixel 810.

In some cases, a plurality of ray directions may correspond to the points of view constituting the multiview image. In this example, the determiner 620 may determine a ray direction corresponding to a point of view closest to a central position of the multiview image to be a ray direction of a corresponding subpixel. The central position of the multiview image may be a position corresponding to a center of an area in which the plurality of points of view constituting the multiview image are distributed.

Referring to FIG. 9, a ray direction of each subpixel of a second panel 910 may be determined by the determiner 620 to be a direction passing through a center of one of elements within an optical layer 920. Each ray direction may correspond to one of a plurality of points of view 930 constituting a multiview image.

FIGS. 10 through 13 illustrate a position determining operation according to at least some example embodiments.

Figure 10:
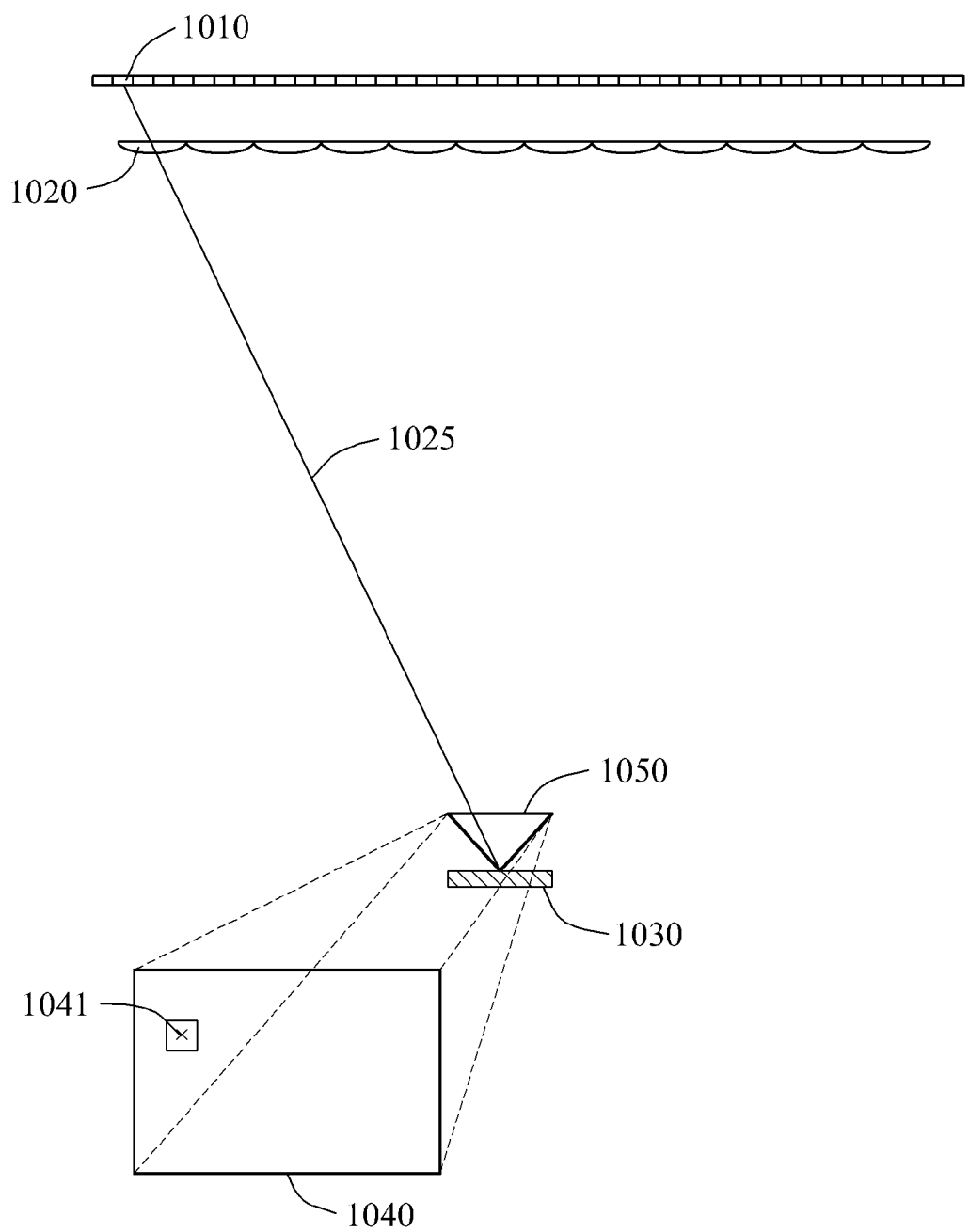
FIGS. 10 through 13 illustrate a position determining operation according to at least some example embodiments.

Referring to FIG. 10, a light output from a subpixel 1010 of a second panel may be output through an element 1020 of an optical layer, and correspond to a point of view 1030. The determiner 620 may determine a position corresponding to the subpixel 1010 within an image 1040 acquired from the point of view 1030 based on a camera parameter for a multiview image.

For example, the determiner 620 may set a virtual camera 1050 for the point of view 1030 based on the camera parameter, and calculate a position at which a light propagated in a ray direction 1025 is incident to a photographing space of the virtual camera 1050 for the point of view 1030. Here, the photographing space of the virtual camera 1050 for the point of view 1030 may correspond to the image 1040 acquired from the point of view 1030, and the light propagated in the ray direction 1025 may be incident at a position 1041 within the image 1040. The determiner 620 may determine the position 1041 to be the position corresponding to the subpixel 1010.

Figure 11:
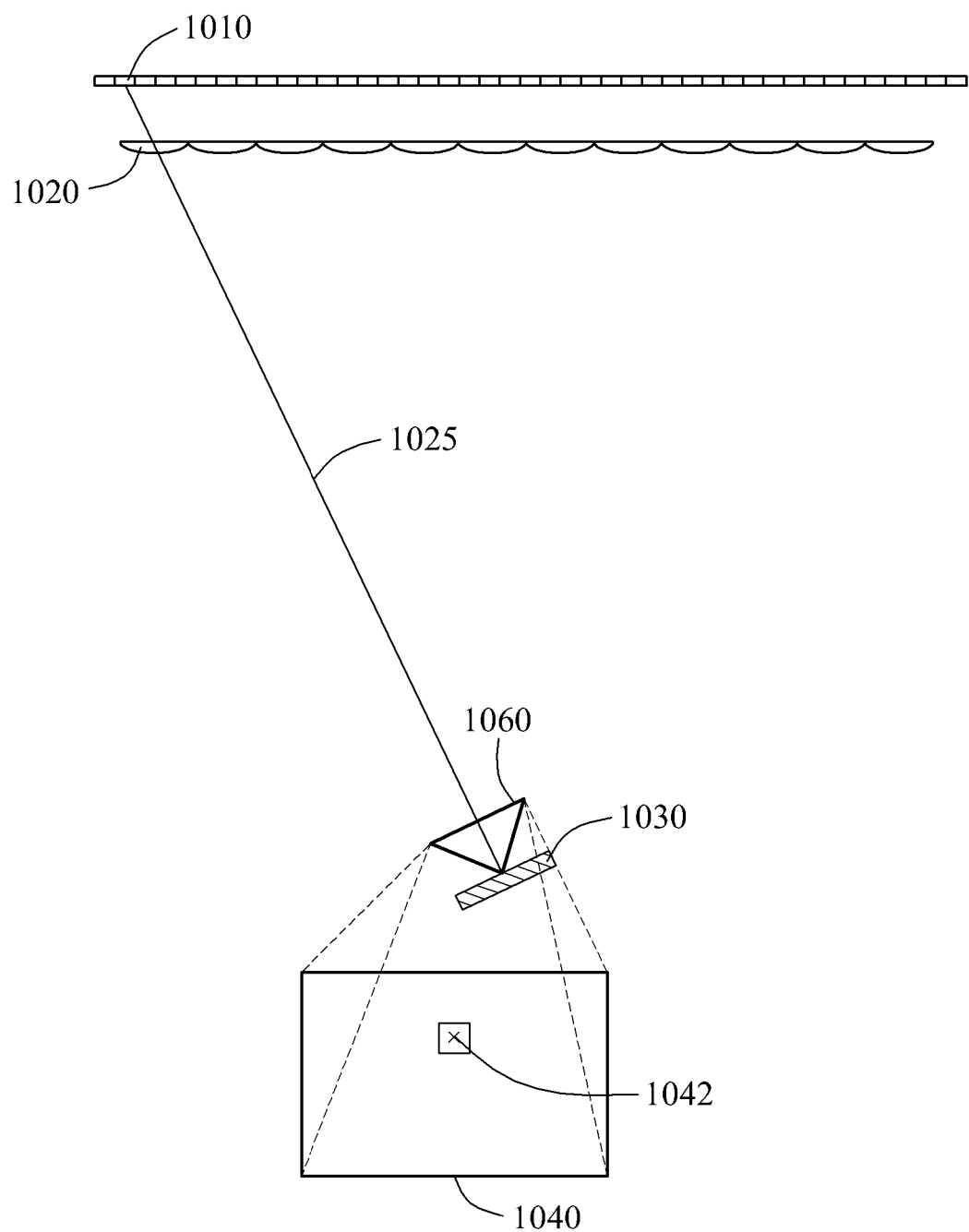

Referring to FIG. 11, the determiner 620 may set a virtual camera 1060 for the point of view 1030 based on a camera parameter, the virtual camera 1060 differing from the virtual camera 1050 of FIG. 10. In this example, the light propagated in the ray direction 1025 may be incident at another position within the image 1040 acquired from the point of view 1030. For example, the light propagated in the ray direction 1025 may be incident at a position 1042 within the image 1040 acquired from the point of view 1030. The determiner 620 may determine the position 1042 to be the position corresponding to the subpixel 1010.

As shown in FIGS. 10-11, a projection direction of the camera 1050 is set to be perpendicular to a plane of a display and a projection direction of the camera 1060 is set to match a direction of a ray emitted from a subpixel.

As described, when the camera parameter is determined by the determiner 620, a position, a projection direction, and a field of view of a camera may be determined the determiner 620 as shown in FIGS. 10 and 11. Consequently, the sole configuration in which the camera captures light in a space may be determined. Then, when the camera captures a plane of the display in such a state, a position of a specific subpixel in an image photographed by the camera may be determined by the determiner 620.

In the case of FIG. 10, light emitted from the subpixel 1010 diagonally enters the camera 1050, and is captured at the position 1041 in the image 1040 photographed by the camera 1050. In the case of FIG. 11, the projection direction of the camera 1060 faces the subpixel 1010. Thus, the subpixel 1010 is captured at the position 1042 corresponding to the center of the image 1040 photographed by the camera 1060.

Figure 12:
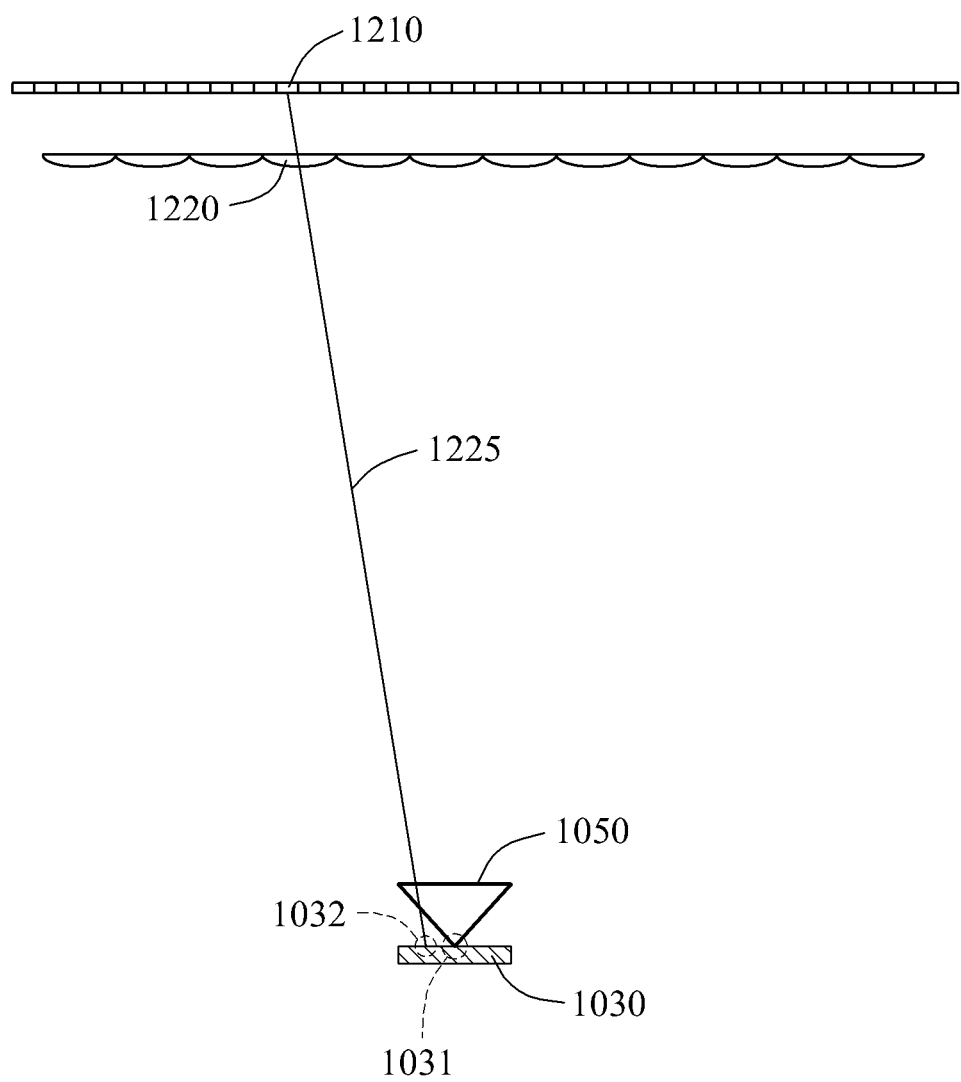

Referring to FIG. 12, a light output from a subpixel 1210 may be output through an element 1220 of an optical layer, and correspond to the point of view 1030. Here, a light propagated in a ray direction 1225 may not be incident exactly at a center 1031 of the virtual camera 1050 for the point of view 1030, and may be incident at another position 1032. In this example, the determiner 620 may determine a position corresponding to the subpixel 1210 using a virtual ray between the element 1220 and the center 1031 of the virtual camera 1050.

Figure 13:
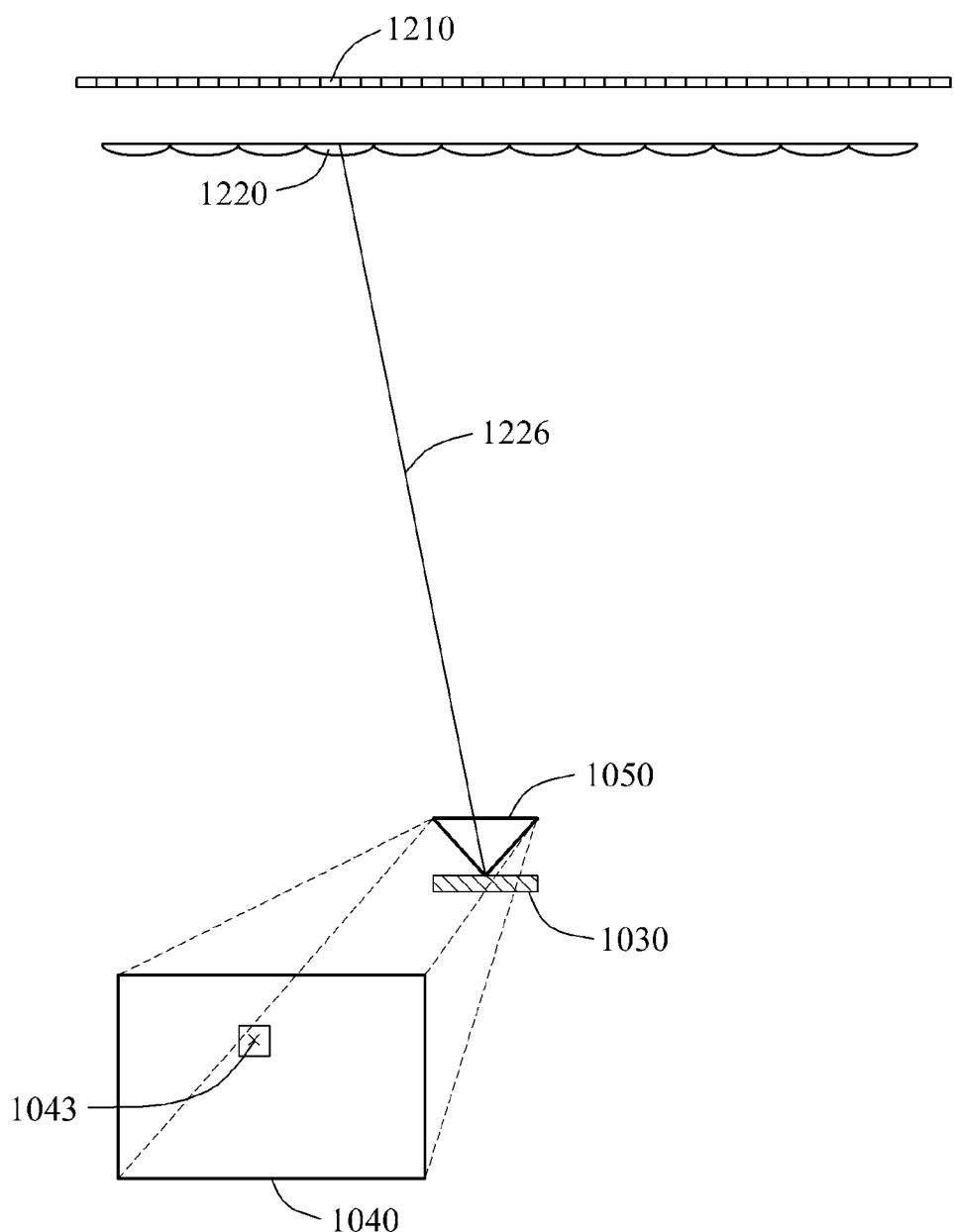

For example, referring to FIG. 13, the determiner 620 may set a ray direction 1226 from a center of the element 1220 toward the center 1031 of the virtual camera 1050. The determiner may calculate a position 1043 at which a light propagated in the ray direction 1226 is to be incident to the image 1040 acquired from the point of view 1030. The determiner may determine the position 1043 to be the position corresponding to the subpixel 1210.

Figure 14:
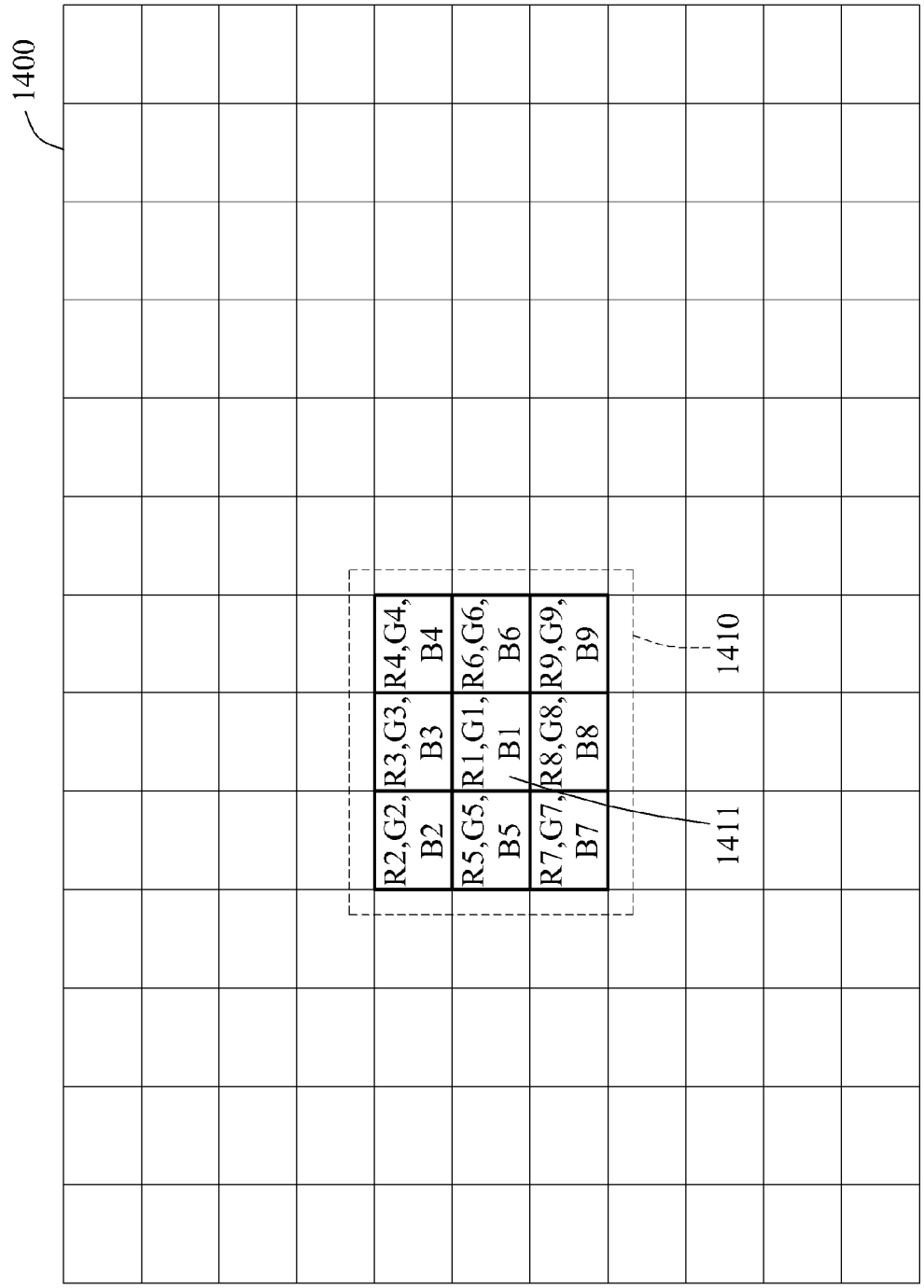

FIGS. 14 and 15 illustrate an area determining operation according to at least some example embodiments.

Referring to FIG. 14, an image 1400 for a first panel may include a plurality of pixels. Each pixel included in the image 1400 for the first panel may include an R subpixel value, a G subpixel value, and a B subpixel value that express a color of the corresponding pixel. The image 1400 for the first panel may be an image corresponding to one of a plurality of points of view constituting multiview images.

The determiner 620 may determine an area 1410 including a position determined within the image 1400 for the first panel. The determined position may correspond to one of the plurality of pixels, for example, a pixel 1411, included in the image 1400 for the first panel. The area 1410 may be a 3×3 pixel group including the pixel 1411 and peripheral pixels thereof.

A size of the area 1410 is not limited to a 3×3 pixel group. For example, referring to FIG. 15, the determiner 620 may determine an area 1510 as a 5×5 pixel group including the pixel 1411 and peripheral pixels thereof. The area including the pixel 1411 may be set in other various forms, for example, in a circular form. Hereinafter, for ease of description, a filtering operation will be described, assuming that an area corresponding to a subpixel is a 3×3 pixel group. However, example embodiments may also be applicable to areas in various sizes and/or various forms.

FIGS. 16 through 23 illustrate a filtering operation according to at least some example embodiments.

Figure 16:
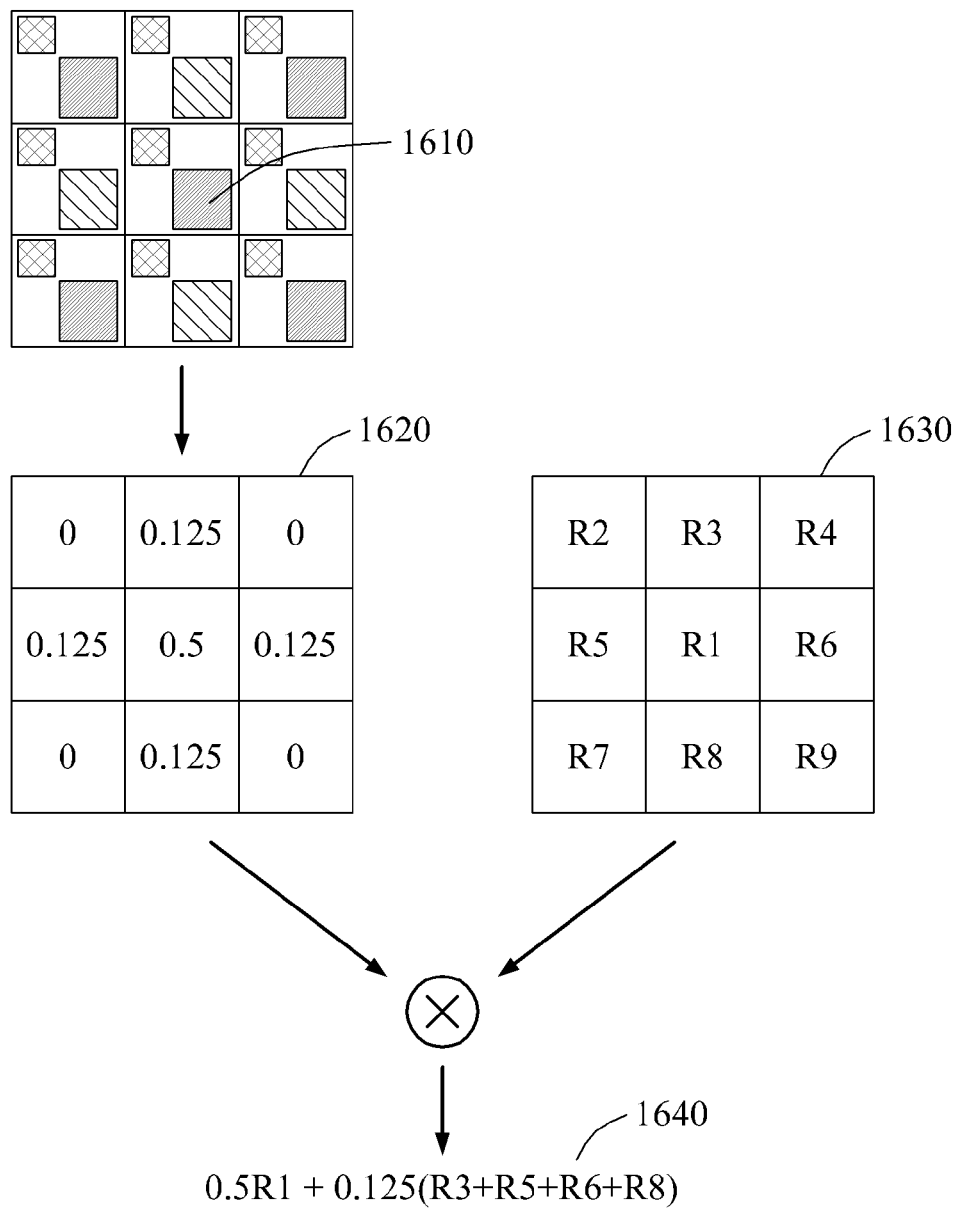
FIGS. 16 through 23 illustrate a filtering operation according to at least some example embodiments.

Referring to FIG. 16, the generator 640 may determine a weight based on a subpixel structure of a second panel to generate a value for a subpixel. For example, the generator 640 may determine weights for a subpixel 1610 and peripheral subpixels thereof to generate a value for the subpixel 1610. The subpixel 1610 may be an R subpixel. R subpixels may not be disposed in up, down, left, and right direction of the subpixel 1610. R subpixels may be disposed in diagonal directions of the subpixel 1610.

The generator 640 may determine a weight map 1620 based on the subpixel structure. The weight map 1620 may be a 3×3 matrix, and have a size equal to a size of the area determined within a view image and corresponding to the subpixel. The weight map 1620 of FIG. 16 is provided as an example only. Weights set in the weight map 1620 may be determined by the generator 640 differently by various schemes that reflect the subpixel structure of the second panel.

As described above, the extractor 630 may extract subpixel values 1630 corresponding to a color identical to a color of the subpixel 1610 from the area determined within the view image. The generator 640 may generate the value for the subpixel 1610 by performing a weighted summation on the subpixel values 1630 extracted from the area determined within the view image and corresponding to the subpixel 1610 based on the weight map 1620. For example, the value for the subpixel 1610 may be calculated by the generator 640 as expressed by an equation 1640.

Figure 17:
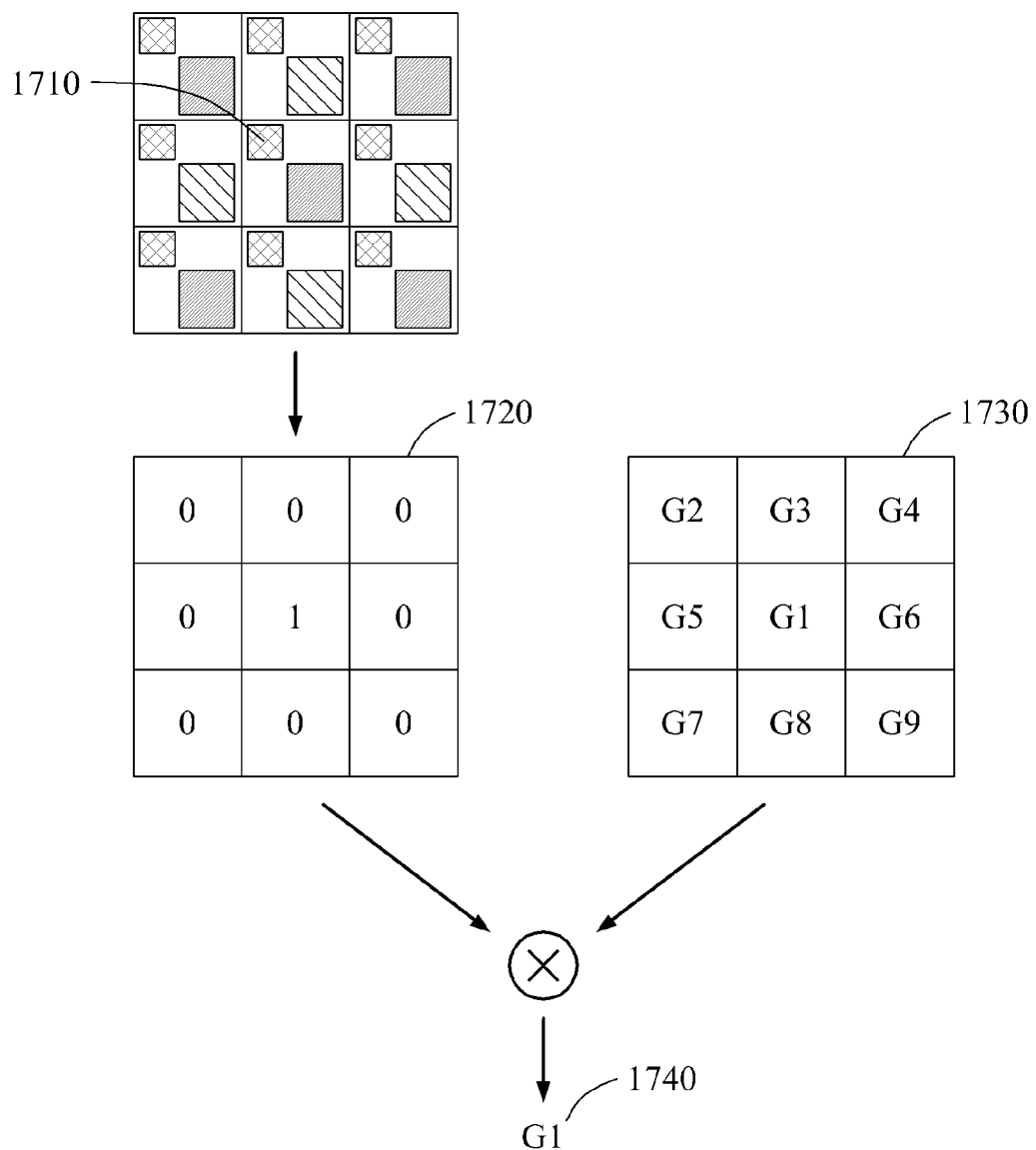

Referring to FIG. 17, a subpixel 1710 may be a G subpixel, and G subpixels may be disposed in up, down, left, right, and diagonal directions of the subpixel 1710. The generator 640 may determine a weight map 1720 based on the subpixel structure. The generator 640 may generate a value for the subpixel 1710 by performing a weighted summation on subpixel values 1730 extracted by the extractor 630 from the area determined within a view image and corresponding to the subpixel 1710 based on the weight map 1720. For example, the value for the subpixel 1710 may be calculated by the generator 640 as expressed by an equation 1740. Since G subpixels are included in all pixels of the second panel in the subpixel structure, the G subpixels may not be substantially filtered.

Figure 18:
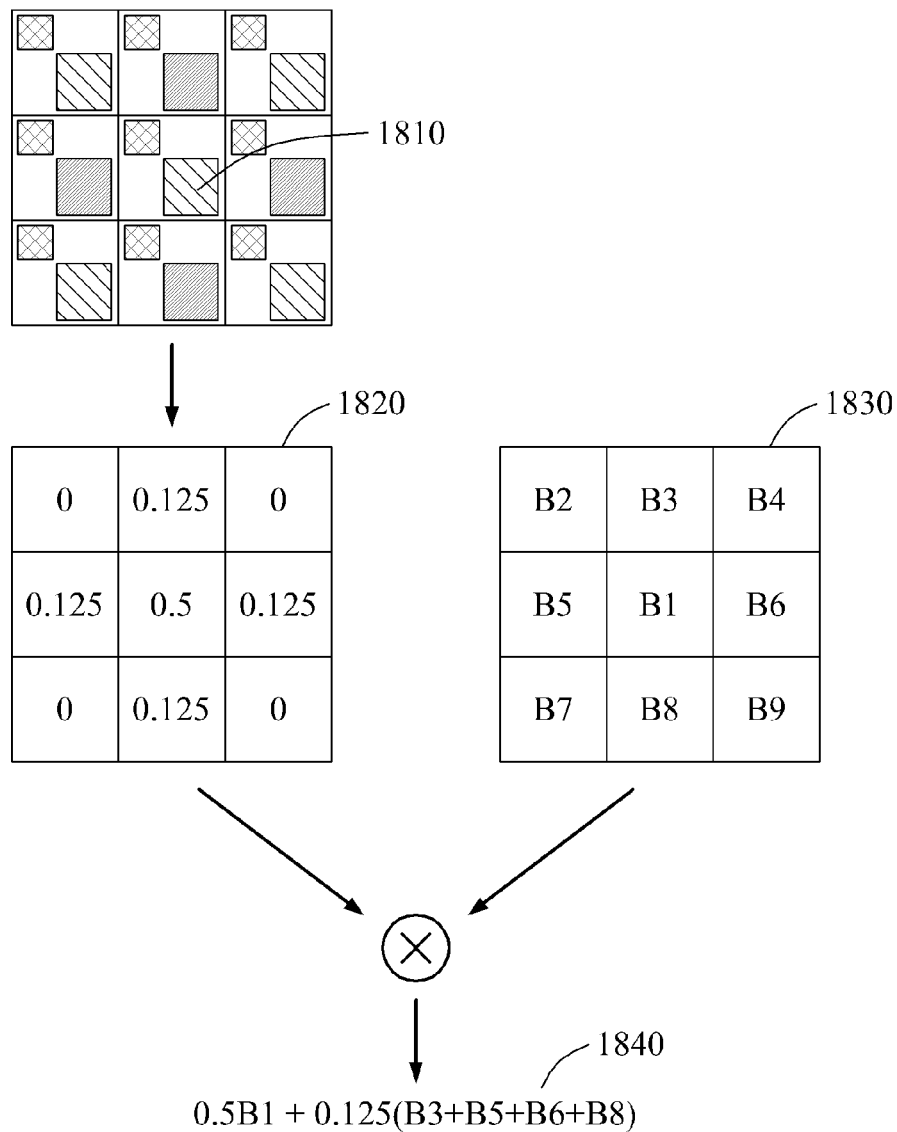

Referring to FIG. 18, a subpixel 1810 may be a B subpixel. B subpixels may not be disposed in up, down, left, and right directions of the subpixel 1810. B subpixels may be disposed in diagonal directions of the subpixel 1810. The generator 640 may determine a weight map 1820 based on the subpixel structure. The generator 640 may generate a value for the subpixel 1810 by performing a weighted summation on subpixel values 1830 extracted by the extractor 630 from the area corresponding to the subpixel 1810 based on the weight map 1820. For example, the value for the subpixel 1810 may be calculated by the generator 640 as expressed by an equation 1840.

Figure 19:
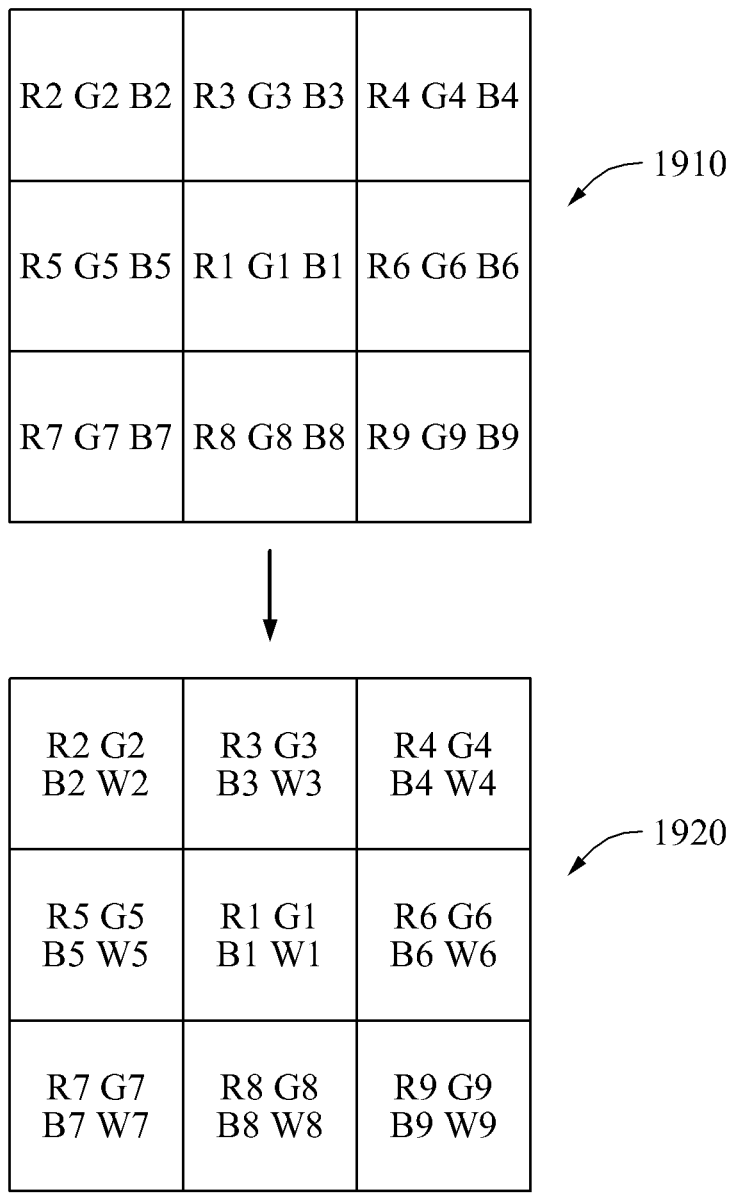

Referring to FIG. 19, the generator 640 may generate W subpixel values for an RGBW PenTile™ panel. For example, the generator 640 may generate W subpixel values of second subpixel values 1920 from first subpixel values 1910 corresponding to an RGB image. For example, a W subpixel value for a predetermined and/or selected pixel may be determined to be a minimum value among an R subpixel value, a G subpixel value, and a B subpixel value of the corresponding pixel. The first subpixel values 1910 may be R subpixel values, G subpixel values, and B subpixel values extracted from an area determined within a view image (area corresponding to subpixel). The second subpixel values 1920 may be used to generate values for W subpixels of the RGBW PenTile™ panel. For example, the generator may generate an R subpixel value, a G subpixel value, a B Subpixel value and a W subpixel value of second subpixel value 1920 from first subpixel values 1910 corresponding to an RGB image. For example, an R subpixel value, a G subpixel value, a B subpixel value and a W subpixel value for a predetermined and/or selected pixel may be determined to be a function of an R subpixel value, a G subpixel value, and a B subpixel value of the corresponding RGB pixel.

Figure 20:
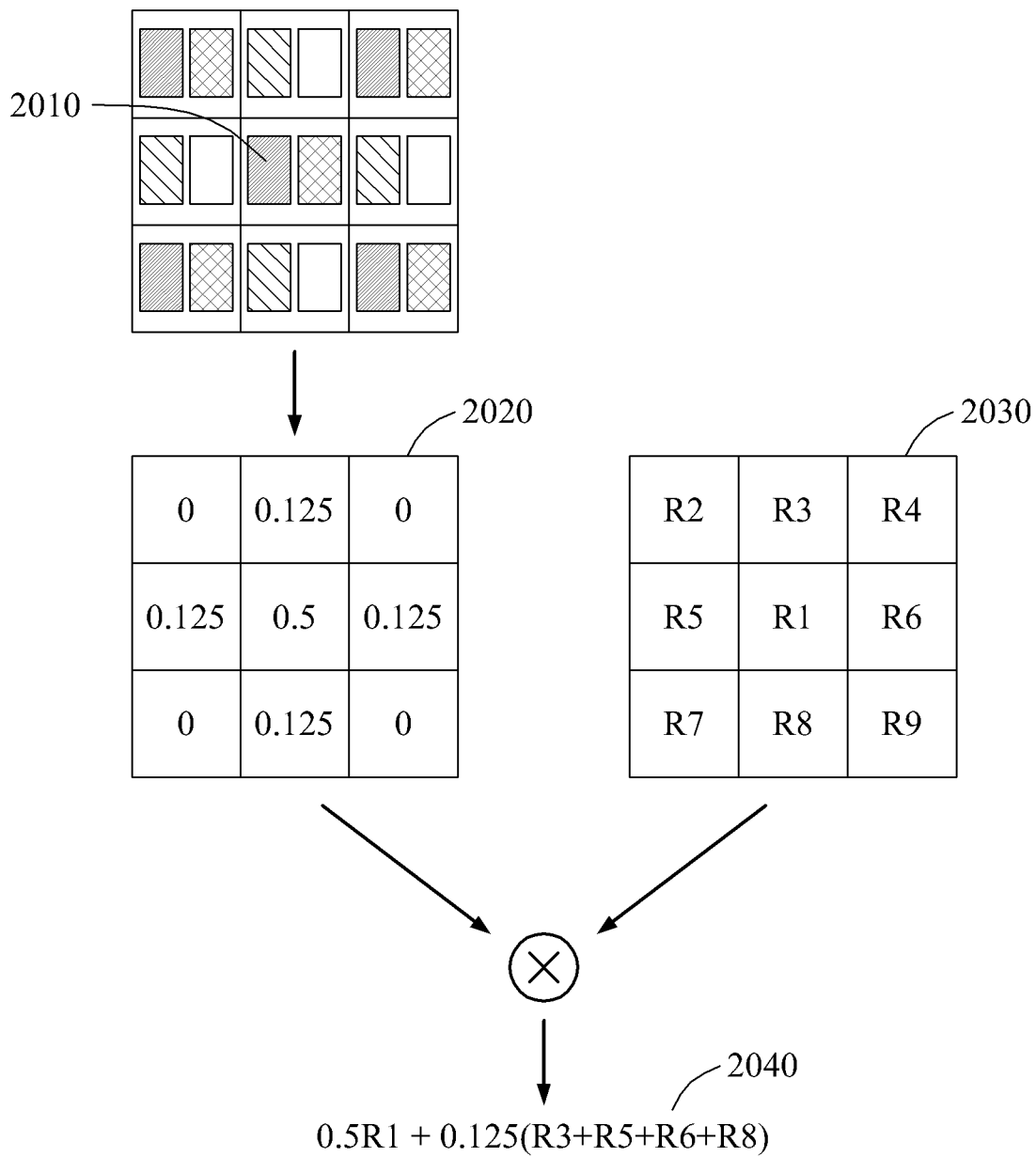

Referring to FIG. 20, the generator 640 may determine weights for a subpixel 2010 and peripheral subpixels thereof to generate a value for the subpixel 2010. The subpixel 2010 may be an R subpixel. R subpixels may not be disposed in up, down, left, and right directions of the subpixel 2010. R subpixels may be disposed in diagonal directions of the subpixel 2010. The generator 640 may determine a weight map 2020 based on the subpixel structure. The generator 640 may generate a value for the subpixel 2010 by performing a weighted summation on subpixel values 2030 extracted from the area determined within a view image and corresponding to the subpixel 2010 based on the weight map 2020. For example, the value for the subpixel 2010 may be calculated by the generator 640 as expressed by an equation 2040.

Figure 21:
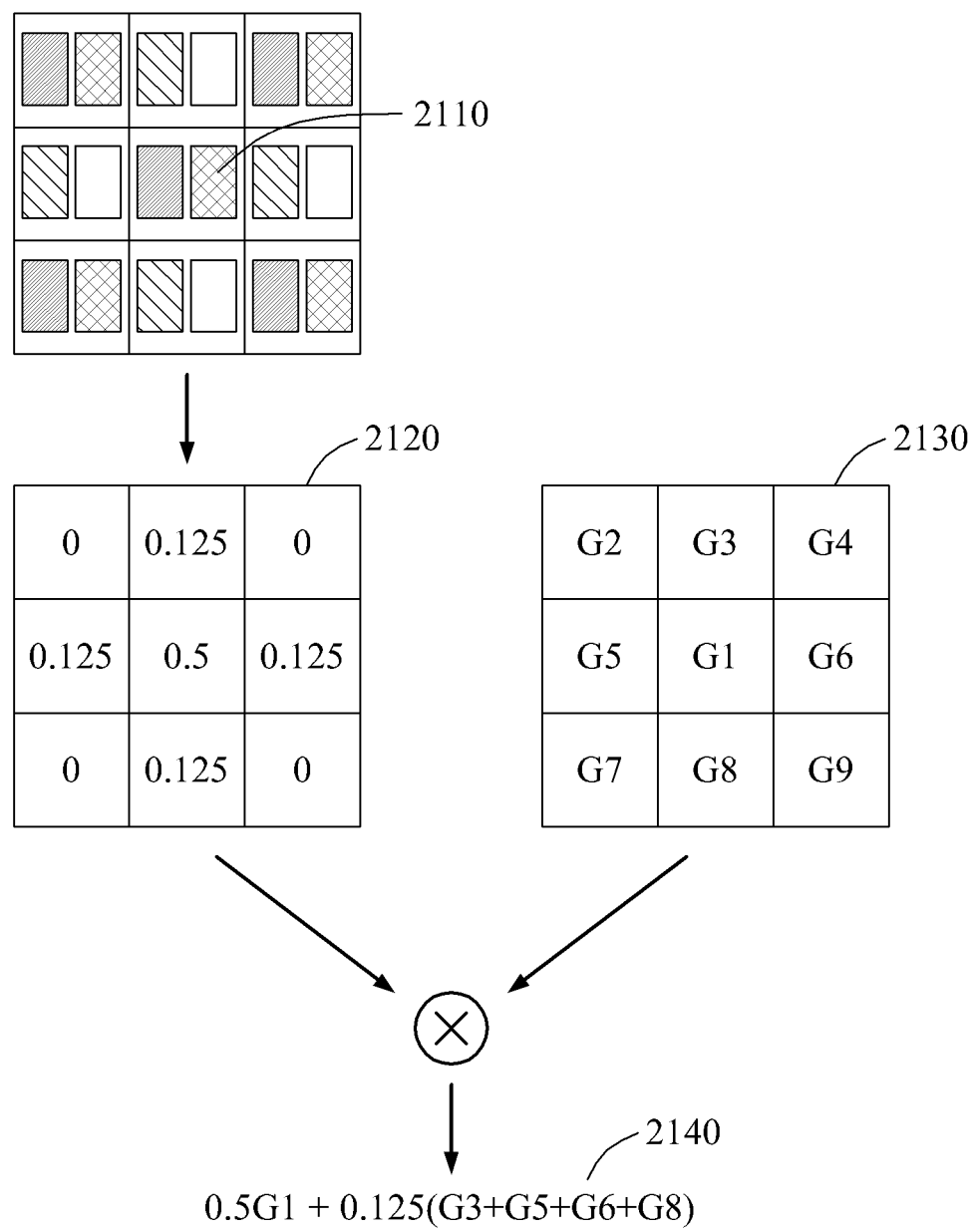

Referring to FIG. 21, a subpixel 2110 may be a G subpixel. G subpixels may not be disposed in up, down, left, and right directions of the subpixel 2110. G subpixels may be disposed in diagonal directions of the subpixel 2110. The generator 640 may determine a weight map 2120 based on the subpixel structure. The generator 640 may generate a value for the subpixel 2110 by performing a weighted summation on subpixel values 2130 extracted from the area corresponding to the subpixel 2210 based on the weight map 2120. For example, the value for the subpixel 2110 may be calculated the generator 640 as expressed by an equation 2140.

Figure 22:
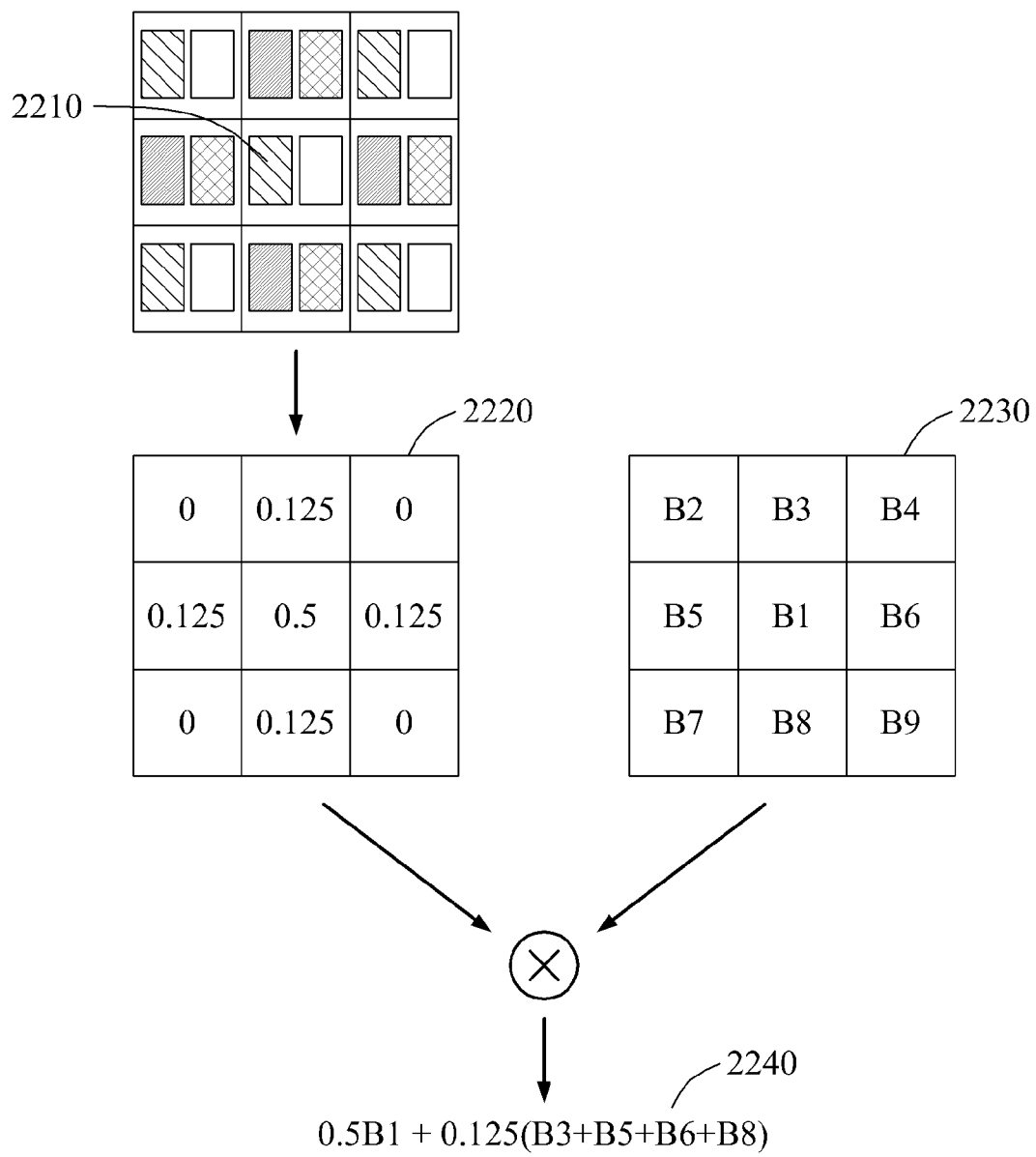

Referring to FIG. 22, a subpixel 2210 may be a B subpixel. B subpixels may not be disposed in up, down, left, and right directions of the subpixel 2210. B subpixels may be disposed in diagonal directions of the subpixel 2210. The generator 640 may determine a weight map 2220 based on the subpixel structure. The generator may 640 generate a value for the subpixel 2210 by performing a weighted summation on subpixel values 2230 extracted from the area determined within a view image and corresponding to the subpixel 2210 based on the weight map 2220. For example, the value for the subpixel 2210 may be calculated as by the generator 640 expressed by an equation 2240.

Figure 23:
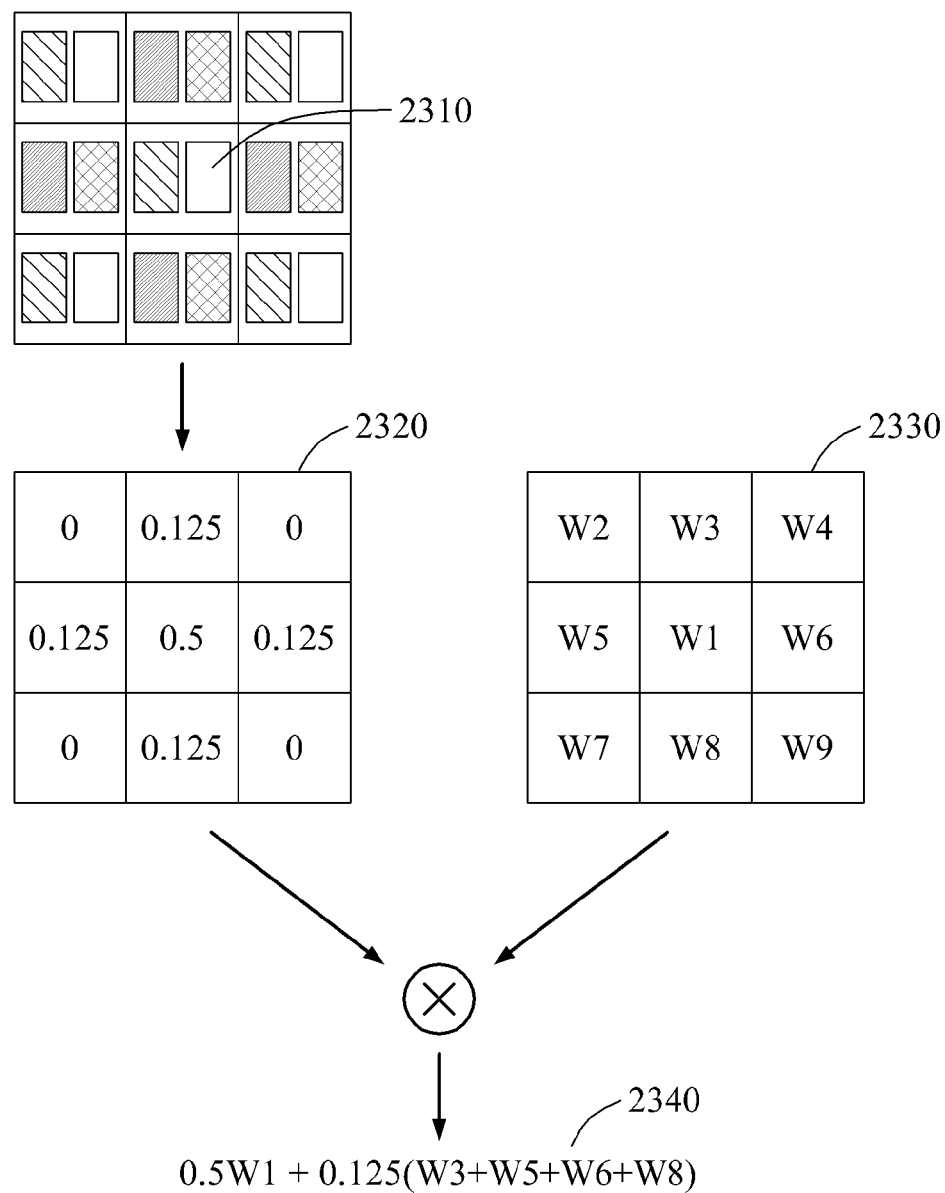

Referring to FIG. 23, a subpixel 2310 may be a W subpixel. W subpixels may not be disposed in up, down, left, and right directions of the subpixel 2310. W subpixels may be disposed in diagonal directions of the subpixel 2310. The generator 640 may determine a weight map 2320 based on the subpixel structure. The generator 640 may generate a value for the subpixel 2310 by performing a weighted summation on subpixel values 2330 generated as described with reference to FIG. 19 based on the weight map 2320. For example, the value for the subpixel 2310 may be calculated by the generator 640 as expressed by an equation 2340.

Figure 24:
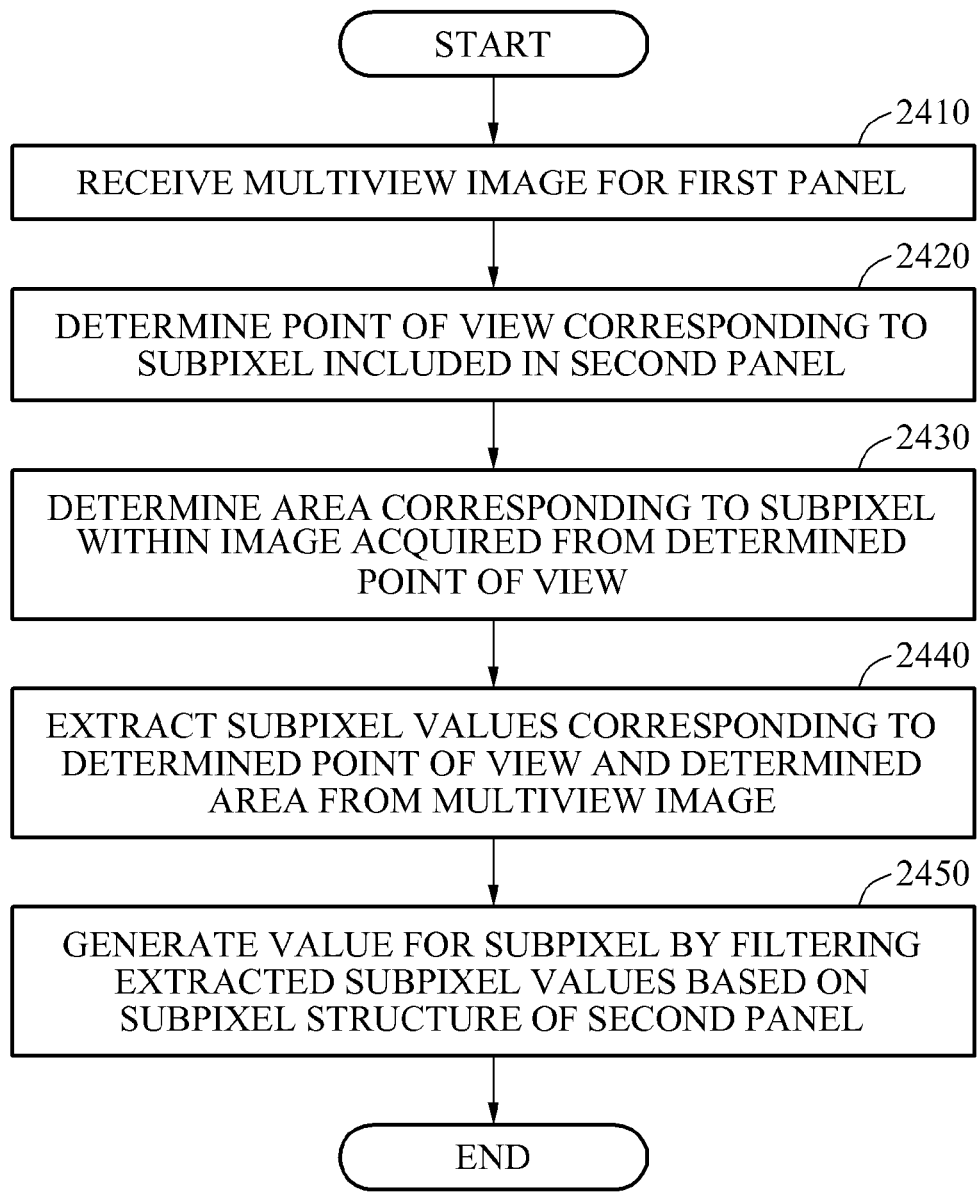
FIG. 24 illustrates a light field rendering method according to at least some example embodiments.

FIG. 24 illustrates a light field rendering method according to at least some example embodiments.

Referring to FIG. 24, the light field rendering method may include operation 2410 of receiving a multiview image for a first panel by a receiver, operation 2420 of determining a point of view corresponding to a subpixel included in a second panel by a determiner, operation 2430 of determining an area corresponding to the subpixel within an image acquired from the determined point of view by the determiner, operation 2440 of extracting subpixel values corresponding to the determined point of view and the determined area from the multiview image by an extractor, and operation 2450 of generating a value for the subpixel by filtering the extracted subpixel values based on a subpixel structure of the second panel by a generator. The descriptions provided with reference to FIGS. 1 through 23 may be applicable to each operation of FIG. 24 and thus, duplicated descriptions will be omitted for brevity.

FIGS. 25 through 28 illustrate an interpolation operation according to at least some example embodiments.

Figure 25:
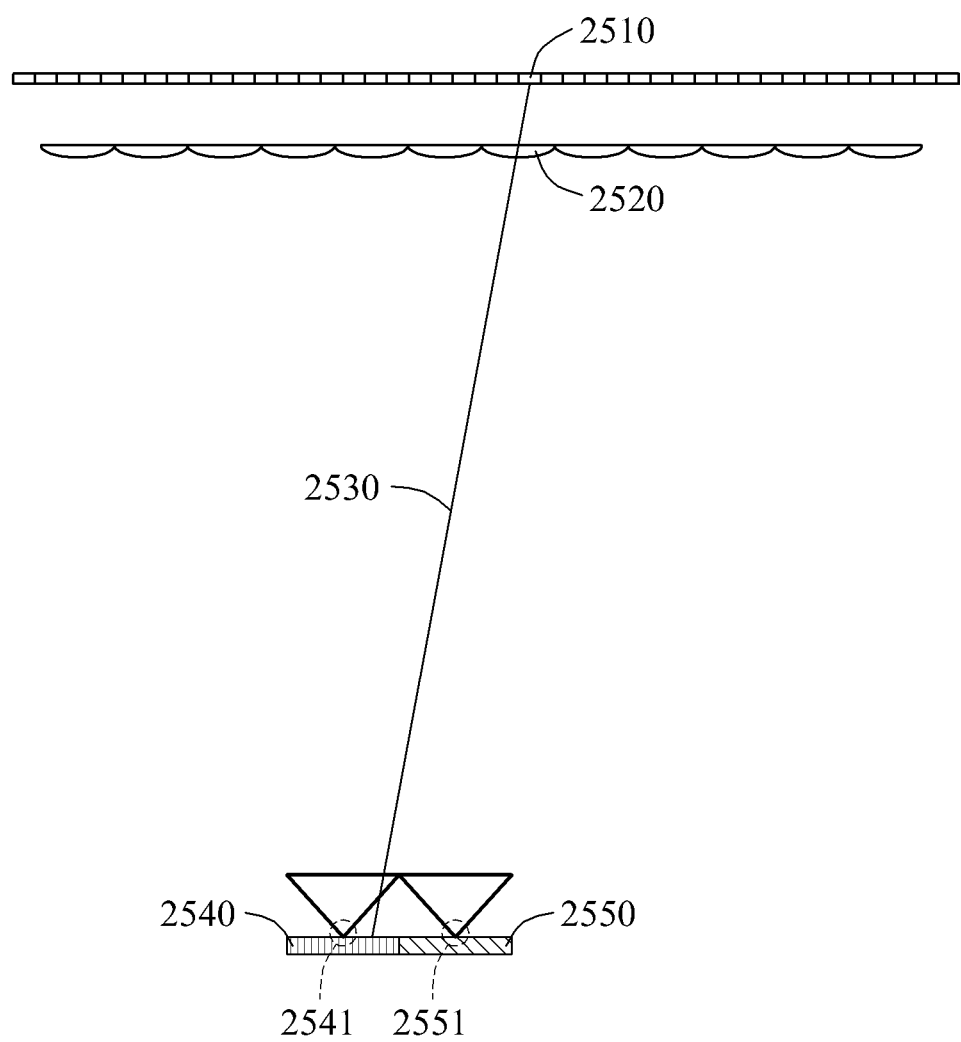
FIGS. 25 through 28 illustrate an interpolation operation according to at least some example embodiments.

Referring to FIG. 25, a light output from a subpixel 2510 of a second panel may be propagated in a ray direction 2530 passing through an element 2520 of an optical layer. In this example, the light propagated in the ray direction 2530 may not precisely correspond to a single point of view. For example, the light propagated in the ray direction 2530 may be incident between a position 2541 of a virtual camera for a first point of view 2540 and a position 2551 of a virtual camera for a second point of view 2550. In this example, it may be expressed that the subpixel 2510 corresponds to a plurality of points of view, for example, the first point of view 2540 and the second point of view 2550.

Figure 26:
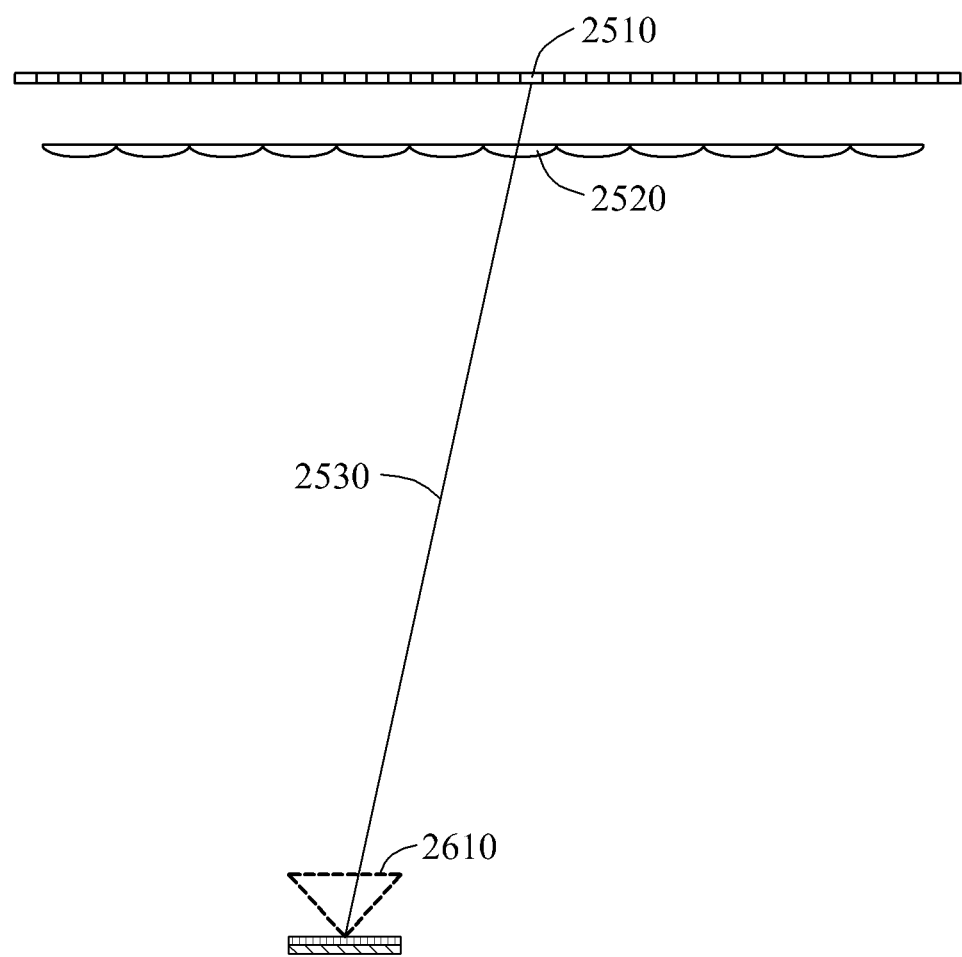
Figure 27:
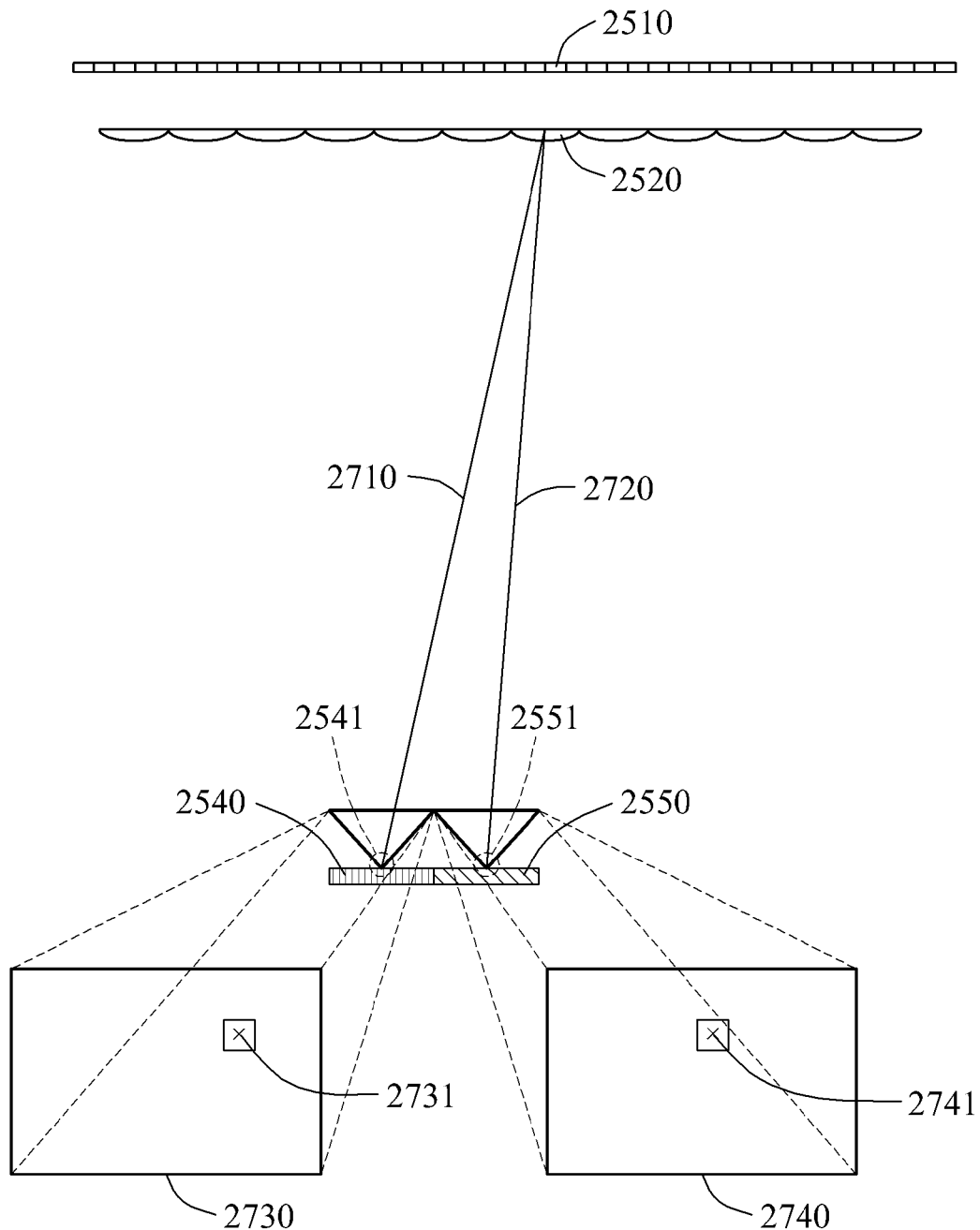

Referring to FIG. 26, to generate a value for the subpixel 2510, a virtual camera 2610 corresponding to the light propagated in the ray direction 2530 may be set. Since a multiview image does not include an image photographed by the virtual camera 2610, the image photographed by the virtual camera 2610 may be generated through an interpolation technique. For example, referring to FIG. 27, the determiner 620 may determine areas corresponding to the subpixel 2510 at a plurality of points of view. The determiner 620 may determine a first area 2731 corresponding to the subpixel 2510 within an image 2730 acquired from the first point of view 2540, based on a ray direction 2710 in which a light is propagated from the element 2520 toward the position 2541 of the virtual camera for the first point of view 2540. Further, the determiner 620 may determine a second area 2741 corresponding to the subpixel 2510 within an image 2740 acquired from the second point of view 2550, based on a ray direction 2720 in which a light is propagated from the element 2520 toward the position 2551 of the virtual camera for the second point of view 2550.

Figure 28:
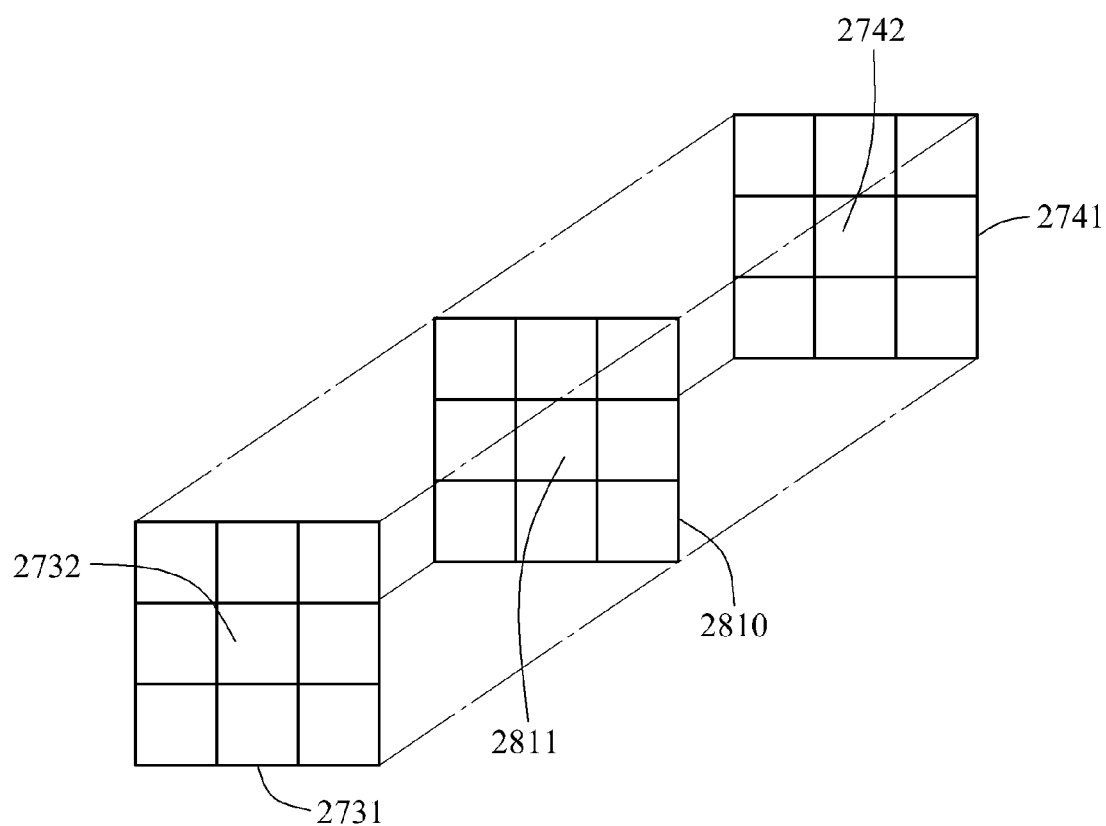

Referring to FIG. 28, the extractor 630 may extract subpixel values of the first area 2731, and subpixel values of the second area 2741 from the multiview image. The extractor 630 may interpolate values of subpixels corresponding to each other between the first area 2731 and the second area 2741. For example, the extractor 630 may generate a value for a subpixel 2811 positioned at a center of a third area 2810 by interpolating a value of a subpixel 2732 positioned at a center of the first area 2731 and a value of a subpixel 2742 positioned at a center of the second area 2741. The third area 2810 may be an area corresponding to the subpixel 2510 within the image photographed by the virtual camera 2610 of FIG. 26. The generator 640 may generate the value for the subpixel 2510 by filtering subpixel values of the third area 2810.

The interpolation technique using two points of view has been described above. However, example embodiments may extend to an interpolation technique using at least three points of view. In this example, at least three points of view may be determined based on ray directions of the subpixel 2510, and areas corresponding to the subpixel 2510 may be determined within images acquired from the respective points of view.

FIGS. 29 through 32 illustrate a light field rendering apparatus and method according to at least some example embodiments.

Figure 29:
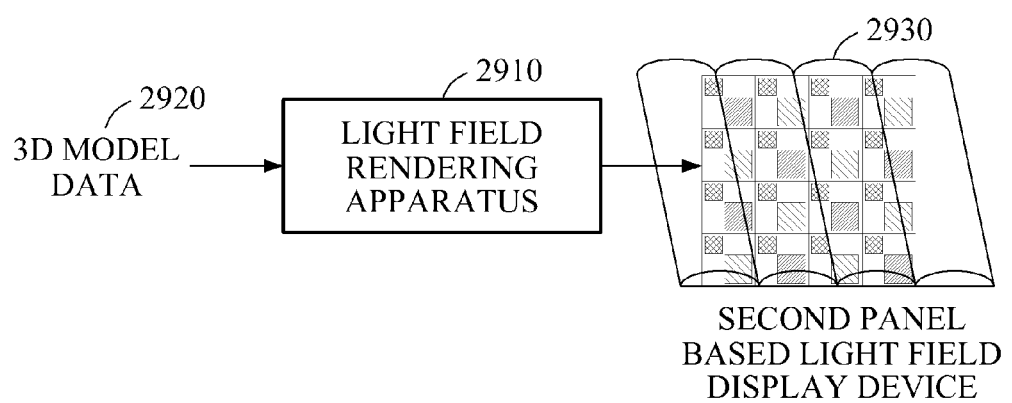
FIGS. 29 through 32 illustrate a light field rendering apparatus and method according to at least some example embodiments.

Referring to FIG. 29, a light field rendering apparatus 2910 may generate subpixel values of a second panel included in a second panel based light field display device 2930 based on 3D model data 2920 representing a 3D model. The second panel may be a panel differing from a general RGB panel, for example, a PenTile™ panel. The light field rendering apparatus 2910 may render a light field by generating the subpixel values of the second panel included in the second panel based light field display device 2930 using the 3D model data 2920.

Figure 30:
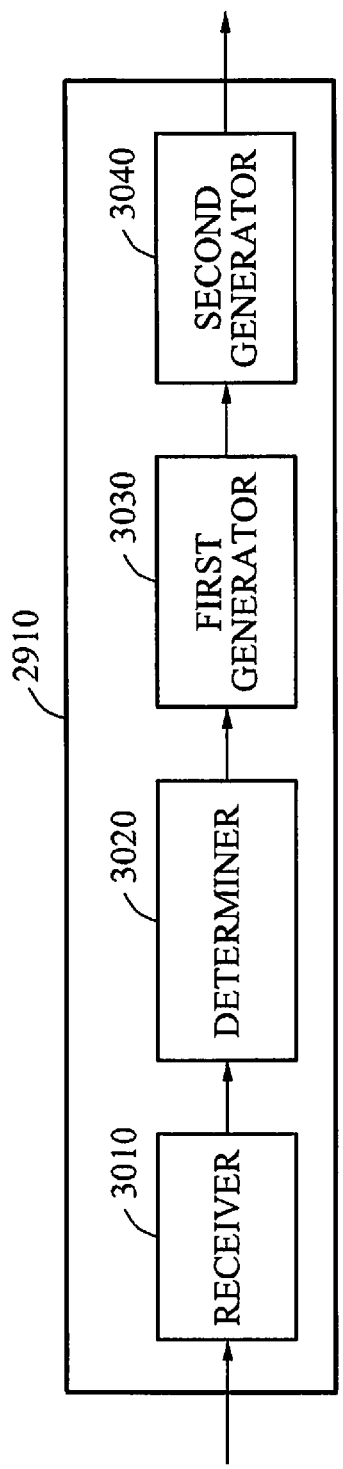

Referring to FIG. 30, the light field rendering apparatus 2910 may include a receiver 3010, a determiner 3020, a first generator 3030, and a second generator 3040. The receiver 3010 may receive data representing a 3D model (e.g. the 3D model data 2920). The receiver 3010 may correspond to the receiver 111 of FIG. 1. The determiner 3020 may determine a point of view corresponding to a subpixel included in a second panel, and an area corresponding to the subpixel within an image acquired from the point of view. The second panel may be a PenTile™ panel. The determiner 3020, the first generator 3030, and the second generator 3040 may correspond to the processor 112 of FIG. 1.

The determiner 3020, the first generator 3030, and the second generator 3040 may be hardware, firmware, hardware executing software or any combination thereof. When at least one of the determiner 3020, the first generator 3030, and the second generator 3040 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the determiner 3020, the first generator 3030, and the second generator 3040.

In the event where at least one of the determiner 3020, the first generator 3030, and the second generator 3040 is a processor executing software, the processor 112 is configured as a special purpose machine to execute the software, stored in the storage medium 113, to perform the functions of the at least one of the determiner 3020, the first generator 3030, and the second generator 3040.

The first generator 3030 may generate subpixel values corresponding to the determined point of view and the determined area based on the 3D model. The second generator 3040 may generate a value for the subpixel by filtering the generated subpixel values based on a subpixel structure of the second panel. The subpixel values generated by the first generator 3030 may be values for a general RGB panel, and the value for the subpixel generated by the second generator 3040 may be a value for the PenTile™ panel.

Figure 31:
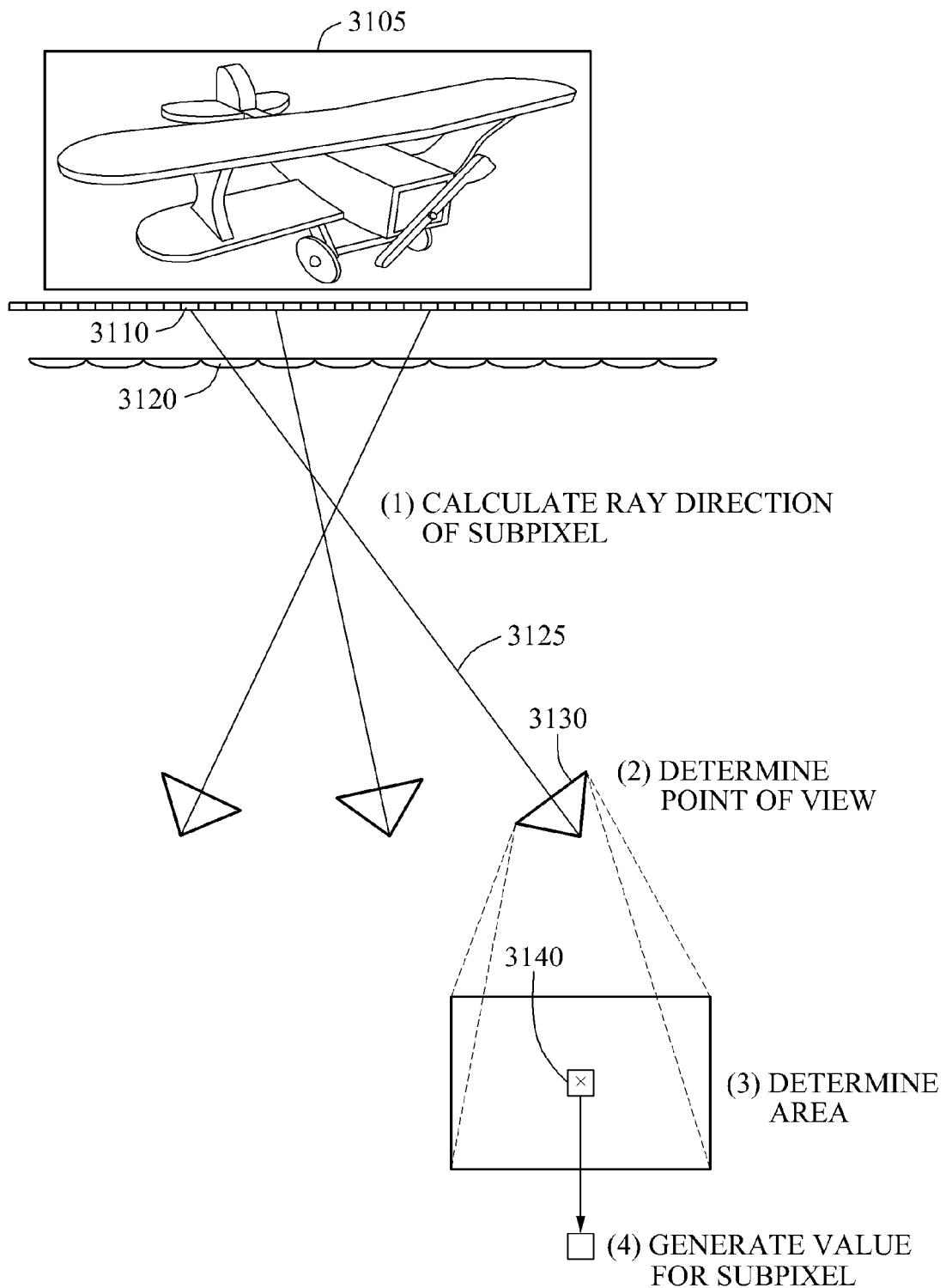

The determiner 3020 may determine the point of view corresponding to the subpixel and the area corresponding to the subpixel based on a ray direction of the subpixel. Referring to FIG. 31, the determiner 3020 may calculate a ray direction of a subpixel 3110 to render a value for the subpixel 3110. For example, a light output from the subpixel 3110 may be propagated in a direction passing through a center of an element 3120 within an optical layer. The determiner 3020 may calculate a ray direction 3125 of the subpixel 3110 based on a distance between the second panel and the optical layer, a position of the subpixel 3110 within the second panel, and a position of the element 3120 through which the light output from the subpixel 3110 passes, among elements within the optical layer.

The determiner 3020 may determine a point of view at which a 3D model 3105 is viewed in the ray direction 3125. The determiner 3020 may determine a position corresponding to the subpixel 3110 based on a position at which the light propagated in the ray direction 3125 is incident to a virtual camera 3130 for the determined point of view. The determiner 3020 may determine an area 3140 including the determined position.

An operation method of the determiner 3020 determining a point of view corresponding to a subpixel and an area corresponding to the subpixel based on a ray direction of the subpixel has been described above. However, example embodiments may be modified to an operation method of the determiner 3020 obtaining a point of view corresponding to a subpixel and an area corresponding to the subpixel from a pre-provided table. For example, when information related to a display, for example, a pixel size of the display, a resolution, a parameter of an optical layer, and a position of the optical layer, is determined, a position, a photographing direction, and an angle of view of a virtual camera for a point of view corresponding to each subpixel may be predetermined and/or selected, and an area corresponding to each subpixel within a photographed image may be predetermined and/or selected accordingly. The pre-provided table may store information associated with positions, photographing directions, and angles of view of virtual cameras for points of view corresponding to subpixels included in a second panel, and areas corresponding to the subpixels within view images. In this example, the determiner 3020 may determine virtual camera information for a point of view corresponding to a subpixel and an area corresponding to the subpixel by referring to the pre-provided table.

The first generator 3030 may generate subpixel values corresponding to the area 3140 based on the 3D model 3105. For example, the first generator 3030 may render RGB subpixel values included in the area 3140 based on the 3D model 3105. In this example, the first generator 3030 may selectively generate values of subpixels of a color identical to a color of the subpixel 3110, among subpixels included in the area 3140. In an example, the subpixel 3110 may be an R subpixel, and the area 3140 may include R subpixels, G subpixels, and B subpixels. The first generator 3030 may selectively generate values of the R subpixels, among the R subpixels, the G subpixels, and the B subpixels within the area 3140.

The second generator 3040 may generate a value for the subpixel 3110 by filtering the subpixel values within the area 3140 based on a subpixel structure of the second panel. For example, the second generator 3040 may determine weights for the subpixel values within the area 3140 based on the subpixel structure or read out determined weights, and calculate the value for the subpixel 3110 by performing a weighted summation on the subpixel values within the area 3140.

Figure 32:
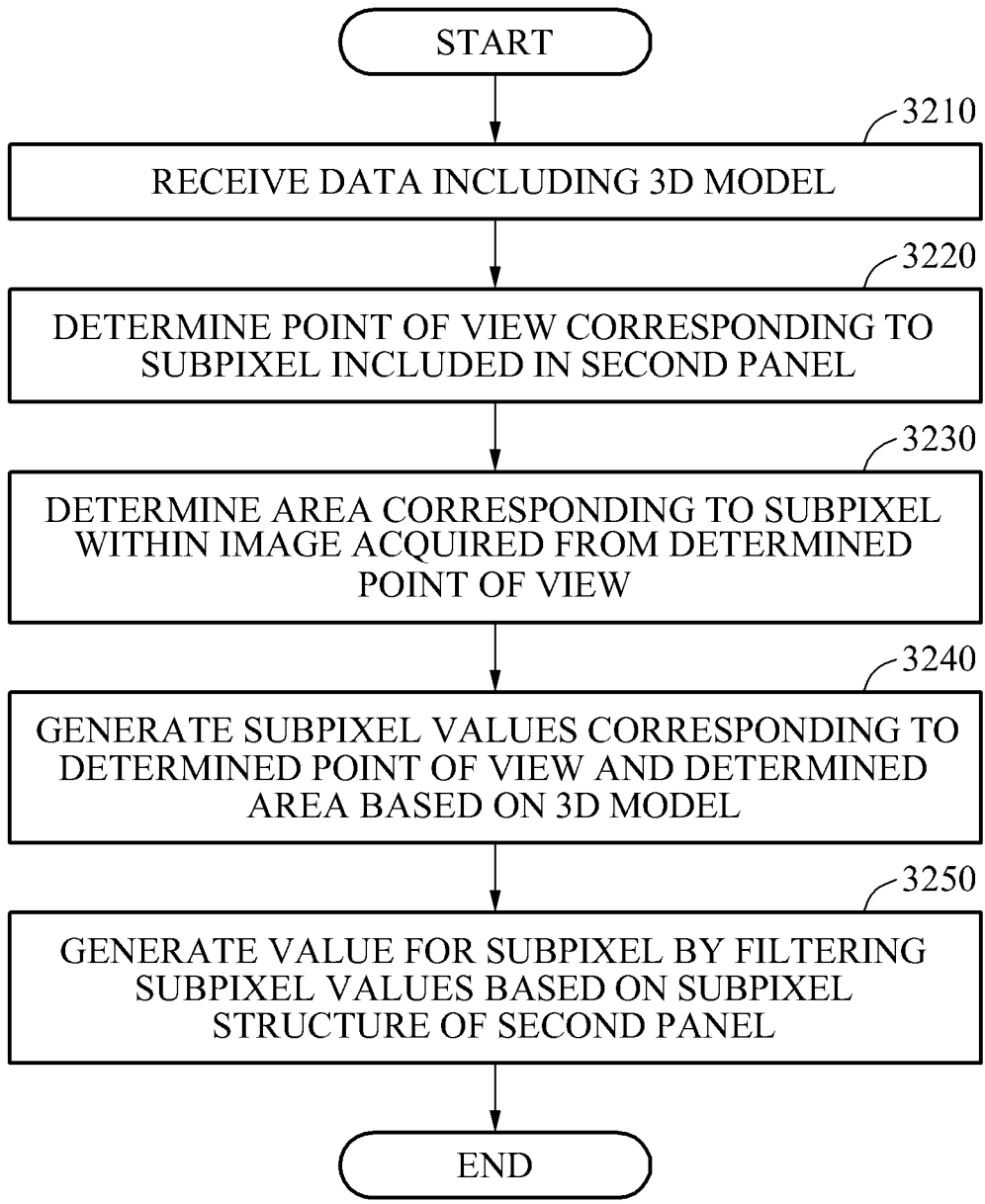

Referring to FIG. 32, a light field rendering method according to at least some example embodiments may include operation 3210 of receiving data including a 3D model by a receiver, operation 3220 of determining a point of view corresponding to a subpixel included in a second panel by a determiner, operation 3230 of determining an area corresponding to the subpixel within an image acquired from the point of view by the determiner, operation 3240 of generating subpixel values corresponding to the determined point of view and the determined area based on the 3D model by a first generator, and operation 3250 of generating a value for the subpixel included in the second panel by filtering the subpixel values corresponding to the area based on a subpixel structure of the second panel by the second generator. The descriptions provided with reference to FIGS. 29 through 31 may be applicable to each operation of FIG. 32 and thus, duplicated descriptions will be omitted for brevity.

FIGS. 33 through 36 illustrate a light field rendering apparatus and method according to at least some example embodiments.

Figure 33:
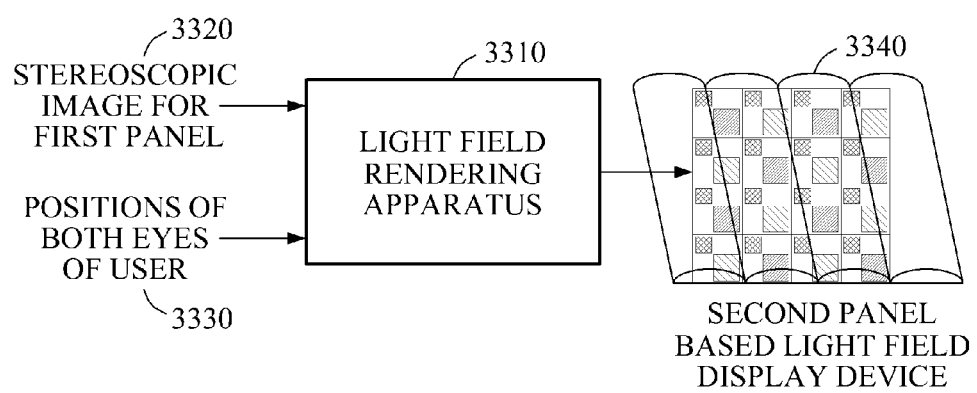
FIGS. 33 through 36 illustrate a light field rendering apparatus and method according to at least some example embodiments.

Referring to FIG. 33, a light field rendering apparatus 3310 may generate subpixel values of a second panel included in a second panel based light field display device 3340 based on a stereoscopic image 3320 for a first panel and positions 3330 of both eyes of a user. The first panel may be a general RGB panel, and the second panel may be a panel differing from the first panel, for example, a PenTile™ panel. The light field rendering apparatus 3310 may render a light field by generating the subpixel values of the second panel included in the second panel based light field display device 3340 based on the stereoscopic image 3320 for the first panel and the positions 3330 of both eyes of the user.

Figure 34:
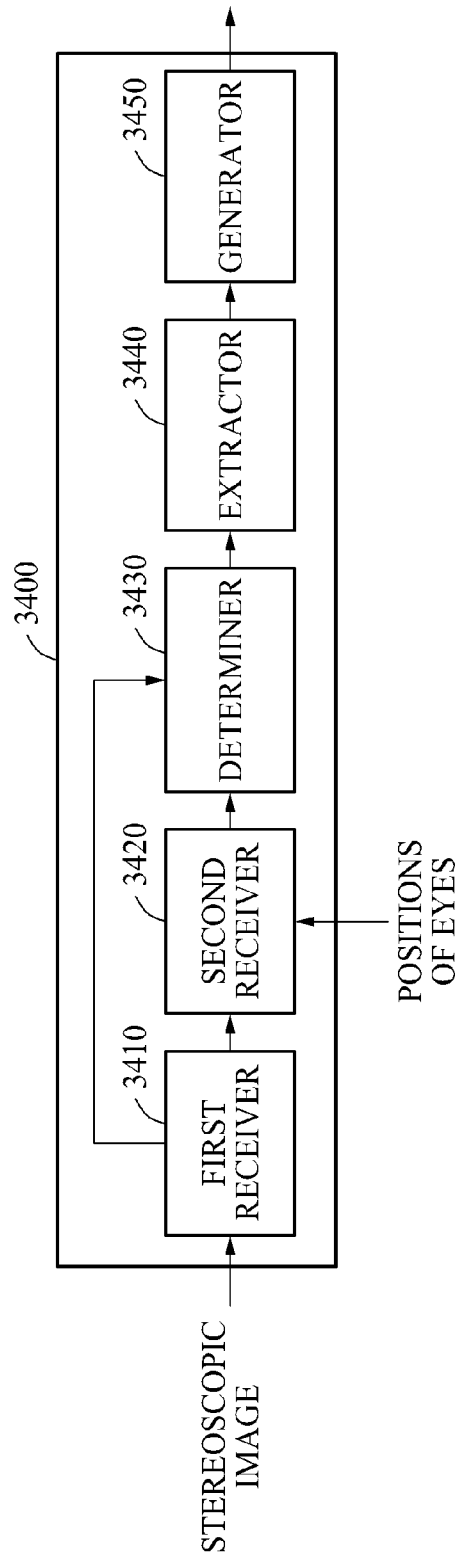
Figure 35:
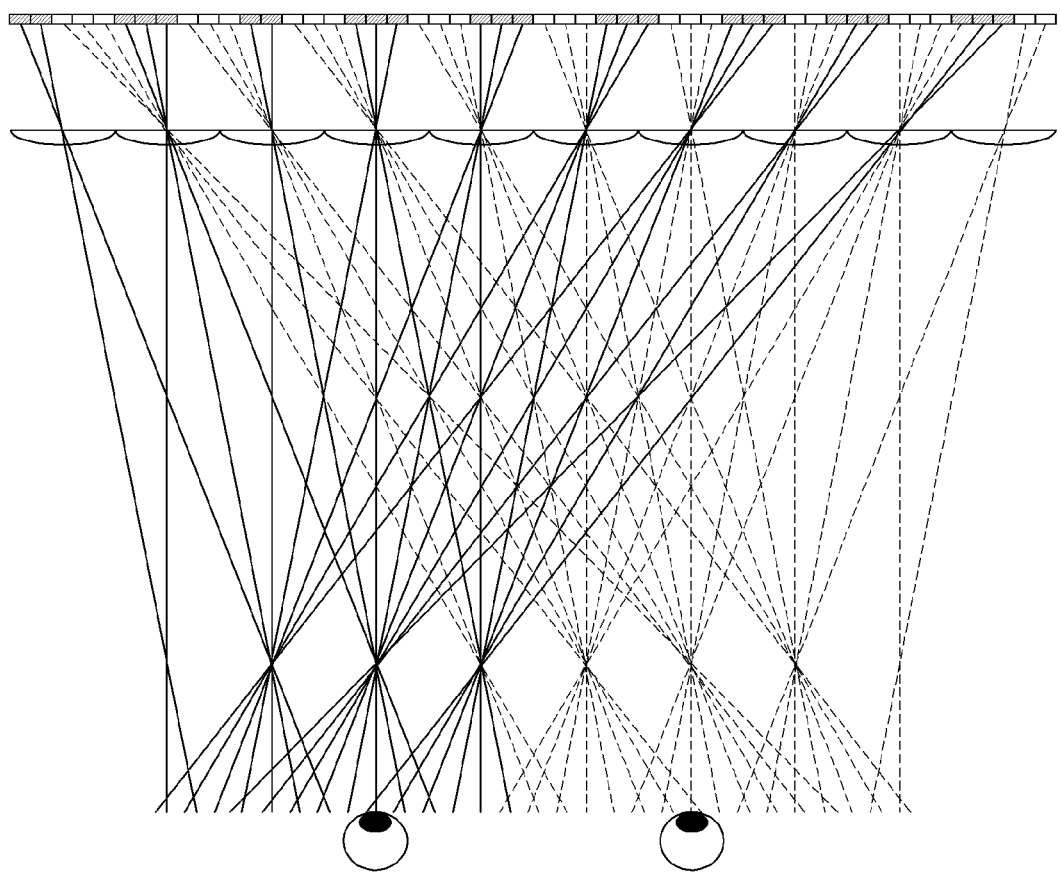

Referring to FIG. 34, a light field rendering apparatus 3400 may include a first receiver 3410, a second receiver 3420, a determiner 3430, an extractor 3440, and a generator 3450. The first receiver 3410 may receive a stereoscopic image for a first panel. The stereoscopic image for the first panel may include a left image for a left eye and a right image for a light eye. The second receiver 3420 may receive positions of both eyes of a user. For example, the second receiver 3420 may receive a signal including information on the positions of both eyes of the user from a sensor configured to track positions of both eyes of a user. The first receiver 3410 and the second receiver 3420 may correspond to the receiver 111 of FIG. 1.

The determiner 3430 may determine whether a subpixel included in a second panel corresponds to the left image or the right image, based on the positions of both eyes of the user. For example, referring to FIG. 35, when a light propagated in a ray direction of a subpixel is determined to reach a position closer to a left eye of a user than a right eye of the user, the corresponding subpixel may be determined to correspond to a left image. Conversely, when the light propagated in the ray direction of the subpixel is determined to reach a position closer to the right eye of the user than the left eye of the user, the corresponding subpixel may be determined to correspond to a right image.

The determiner 3430 may determine an area corresponding to the subpixel within an image corresponding to the subpixel. For example, the determiner 3430 may detect a position of the subpixel within the second panel. The determiner 3430 may determine the position of the subpixel within the second panel to be a position corresponding to the subpixel within the image corresponding to the subpixel, and determine a peripheral area of the determined position to be the area corresponding to the subpixel.

The extractor 3440 may extract subpixel values included in the area corresponding to the subpixel from the image corresponding to the subpixel. In this example, the extractor 3440 may selectively extract values of subpixels of a color identical to a color of the subpixel.

The generator 3450 may generate a value for the subpixel by filtering the subpixel values extracted from the area corresponding to the subpixel based on a subpixel structure of the second panel. For example, the generator 3450 may determine weights for the subpixel values based on the subpixel structure or read out determined weights, and calculate the value for the subpixel by performing a weighted summation on the subpixel values using the weights.

The determiner 3430, the extractor 3440, and the generator 3450 may correspond to the processor 112 of FIG. 1.

The determiner 3430, the extractor 3440, and the generator 3450 may be hardware, firmware, hardware executing software or any combination thereof. When at least one of the determiner 3430, the extractor 3440, and the generator 3450 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the determiner 3430, the extractor 3440, and the generator 3450.

In the event where at least one of the determiner 3430, the extractor 3440, and the generator 3450 is a processor executing software, the processor 112 is configured as a special purpose machine to execute the software, stored in the storage medium 113, to perform the functions of the at least one of the determiner 3430, the extractor 3440, and the generator 3450.

Figure 36:
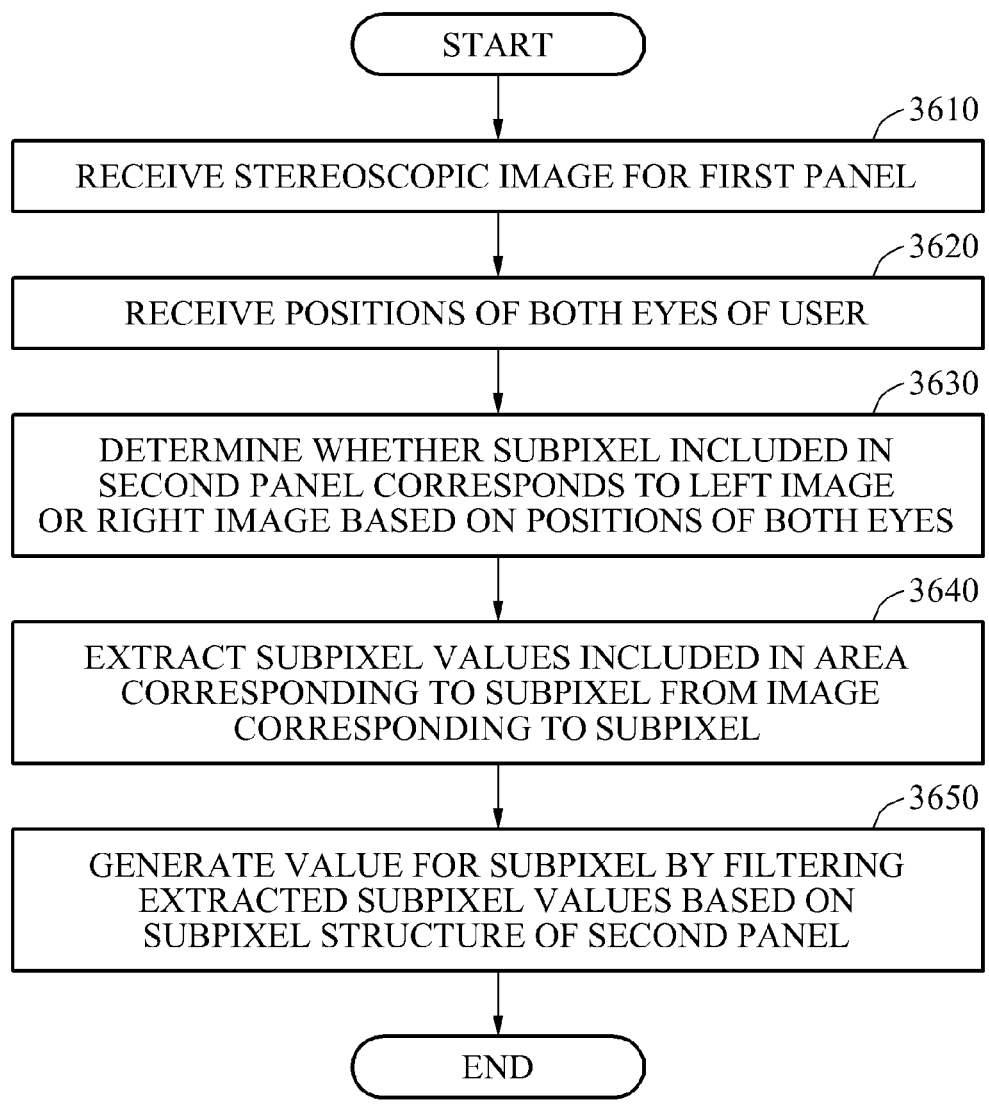

Referring to FIG. 36, a light field rendering method according to at least some example embodiments may include operation 3610 of receiving a stereoscopic image for a first panel by a first receiver, operation 3620 of receiving positions of both eyes of a user by a second receiver, operation 3630 of determining whether a subpixel included in a second panel corresponds to a left image or a right image based on the positions of both eyes by a determiner, operation 3640 of extracting subpixel values included in an area corresponding to the subpixel from an image corresponding to the subpixel by an extractor, and operation 3650 of generating a value for the subpixel by filtering the extracted subpixel values based on a subpixel structure of the second panel by the generator. The descriptions provided with reference to FIGS. 33 through 35 may be applicable to each operation of FIG. 36 and thus, duplicated descriptions will be omitted for brevity.

FIGS. 37 through 40 illustrate a light field rendering apparatus and method according to example embodiments.

Figure 37:
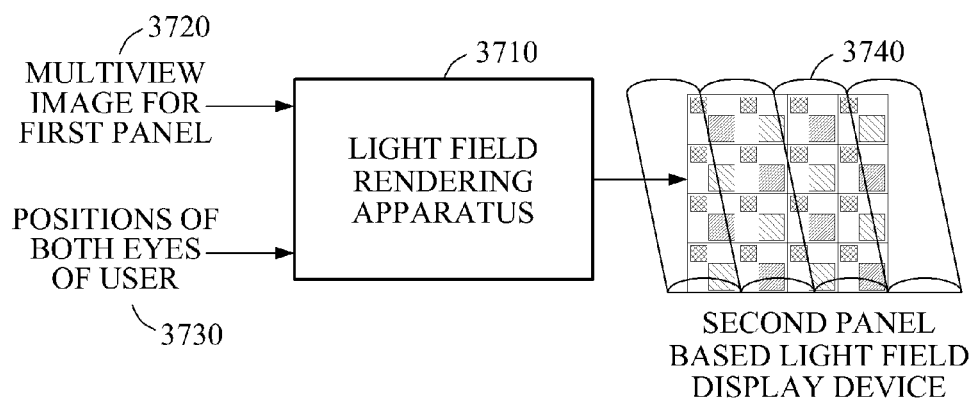

Referring to FIG. 37, a light field rendering apparatus 3710 may generate subpixel values of a second panel included in a second panel based light field display device 3740 based on a multiview image 3720 for a first panel and positions 3730 of both eyes of a user. The first panel may be a general RGB panel, and the second panel may be a panel differing from the first panel, for example, a PenTile™ panel. The light field rendering apparatus 3710 may render a light field by generating the subpixel values of the second panel included in the second panel based light field display device 3740 based on the multiview image 3720 for the first panel and the positions 3730 of both eyes of the user.

Figure 38:
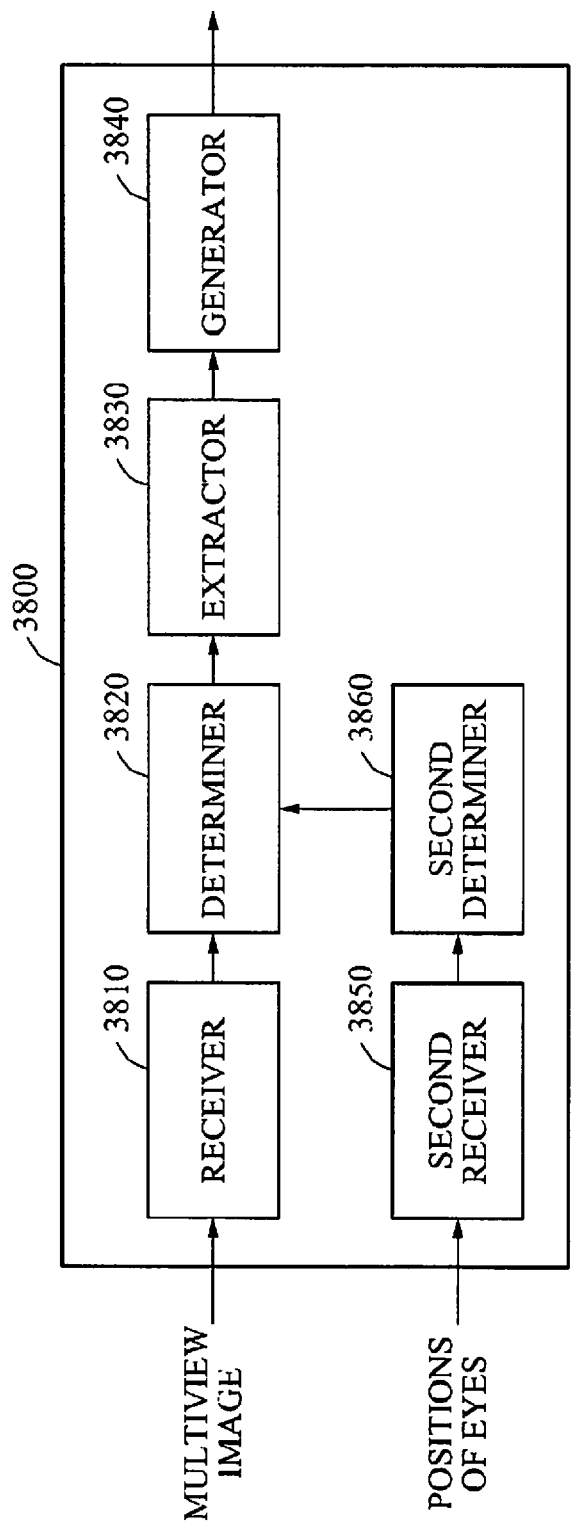
Figure 39:
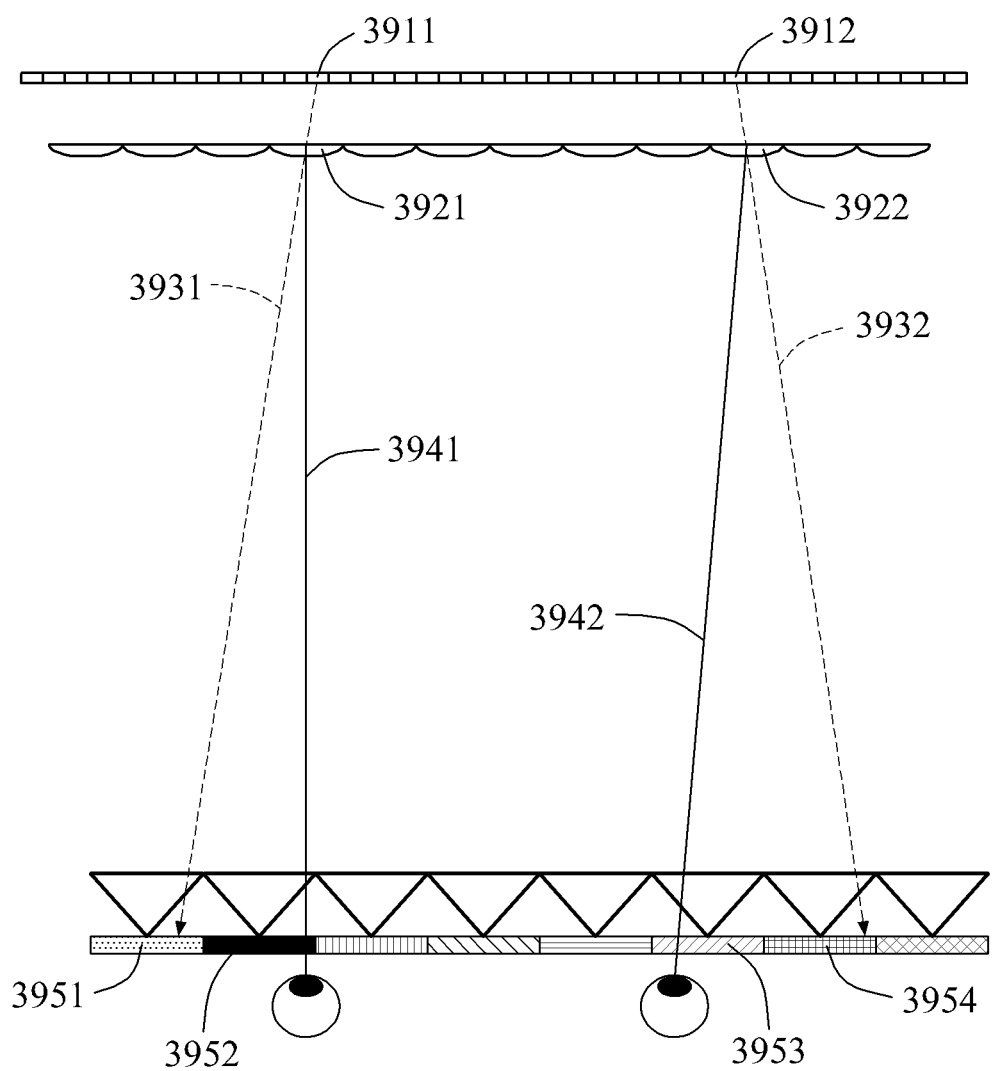

Referring to FIG. 38, a light field rendering apparatus 3800 may include a receiver 3810, a determiner 3820, an extractor 3830, a generator 3840, a second receiver 3850, and a second determiner 3860. The receiver 3810 may receive a multiview image for a first panel. The multiview image for the first panel may include a plurality of points of view. The second receiver 3850 may receive positions of both eyes of a user. For example, the second receiver 3850 may receive a signal including information on the positions of both eyes of the user from a sensor configured to track positions of both eyes of a user. The receiver 3810 and the second receiver 3850 may correspond to the receiver 111 of FIG. 1.

The second determiner 3860 may determine whether a subpixel included in the second panel corresponds to a left eye or a right eye based on the positions of both eyes of the user. For example, referring to FIG. 39, when a light propagated in a ray direction 3931 of a subpixel 3911 is determined to reach a position closer to a left eye of a user than a right eye of the user, the subpixel 3911 may be determined to correspond to a left image. Conversely, when a light propagated in a ray direction 3932 of a subpixel 3912 is determined to reach a position closer to the right eye of the user than the left eye of the user, the subpixel 3912 may be determined to correspond to a right image.

The determiner 3820 may select one of a plurality of points of view included in the multiview image based on a position of an eye corresponding to the subpixel. For example, referring to FIG. 39, a light output from the subpixel 3911 may pass through an element 3921 of an optical layer, and correspond to the left eye of the user. The determiner 3820 may select a point of view 3952, instead of a point of view 3951, from among the plurality of points of view included in the multiview image based on a direction 3941 from the element 3921 toward the left eye of the user. Further, a light output from the subpixel 3912 may pass through an element 3922 of the optical layer, and correspond to the right eye of the user. The determiner 3820 may select a point of view 3953, instead of a point of view 3954, from among the plurality of points of view included in the multiview image based on a direction 3942 from the element 3922 toward the right eye of the user.

The determiner 3820 may determine an area corresponding to the subpixel within an image acquired from the selected point of view. For example, the determiner 3820 may determine a position corresponding to the subpixel within the image acquired from the selected point of view based on a camera parameter, and determine an area of a predetermined and/or selected size including the determined position to be the area corresponding to the subpixel.

The extractor 3830 may extract subpixel values included in the area corresponding to the subpixel from the image acquired from the selected point of view. In this example, the extractor 3830 may selectively extract values of subpixels of a color identical to a color of the subpixel.

The generator 3840 may generate a value for the subpixel by filtering the subpixel values extracted from the image acquired from the selected point of view based on a subpixel structure of the second panel. For example, the generator 3840 may determine weights for the subpixel values based on the subpixel structure or read out determined weights, and calculate the value for the subpixel by performing a weighted summation on the subpixel values using the weights.

The determiner 3820, the extractor 3830, the generator 3840, and the second determiner 3860 may correspond to the processor 112 of FIG. 1.

Referring to FIG. 40, a light field rendering method according to at least some example embodiments may include operation 4010 of receiving a multiview image for a first panel by a receiver, operation 4020 of receiving positions of both eyes of a user by a second receiver, operation 4030 of determining whether a subpixel included in a second panel corresponds to a left eye or a right eye based on the positions of both eyes by a second determiner, operation 4040 of selecting one of a plurality of points of view included in the multiview image based on a position of an eye corresponding to the subpixel by a determiner, operation 4050 of determining an area corresponding to the subpixel within an image acquired from the selected point of view by an extractor, operation 4060 of extracting subpixel values corresponding to the determined area from the multiview image, and operation 4070 of generating a value for the subpixel by filtering the extracted subpixel values based on a subpixel structure of the second panel by a generator. The descriptions provided with reference to FIGS. 37 through 39 may be applicable to each operation of FIG. 40 and thus, duplicated descriptions will be omitted for brevity.

Throughout FIGS. 1-40, it should be understood that features of a light field rendering apparatus may be combined or separated. For example, the receiver 3810 and the second receiver 3850 may be a single receiver.

Example embodiments may provide a flat panel display (FPD) based light field display technique. Example embodiments may provide a light field display technique based on a PenTile™ panel having a subpixel structure differing from that of a general RGB panel.

Example embodiments may provide technology that diversifies types of FPDs constituting a light field display, and minimizes a subpixel structure conversion operation when performing light field rendering for a new subpixel structure. Thus, example embodiments may provide technology that efficiently renders a light field. Further, example embodiments may provide a rendering algorithm that displays an image to be suitable for positions of both eyes of a user in an FPD based light field display device.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing method comprising:
    receiving image data for a first panel; and
    processing the image data based on an optical characteristic of a second panel and a subpixel structure of a plurality of subpixels in the second panel, the second panel being configured for a 3D display device, the processing including,
    obtaining a point of view corresponding to a selected subpixel in the second panel based on the optical characteristic,
    obtaining an area corresponding to the selected subpixel within an image from the point of view based on the optical characteristic, the area including neighboring subpixels around the selected subpixel,
    obtaining first panel subpixel values of the selected subpixel and the neighboring subpixels based on the received image data, and
    generating a second panel value for the selected subpixel by filtering the obtained first panel subpixel values based on the subpixel structure of the second panel,
    the generated second panel value for the selected subpixel being used for a display using the 3D display device, and
    wherein the optical characteristic comprises a characteristic associated with a ray direction of the selected subpixel of the plurality of subpixels in the second panel.

2. The method of claim 1, wherein the optical characteristic is based on at least one of:
    a distance between the second panel and an optical layer;
    a position of at least one of the plurality of subpixels in the second panel; and
    a position of an optical element through with respect to light output by the at least one subpixel, the optical element being in the optical layer.

3. The method of claim 1, wherein the subpixel structure of the second panel comprises at least one of:
    colors of the subpixels in the second panel, each subpixel associated with a color;
    an arrangement of the subpixels in the second panel based on the colors;
    sizes of the subpixels of each color in the second panel; and
    a number of the subpixels of each color in the second panel.

4. The method of claim 1, wherein the first panel is a red, green, and blue (RGB) stripe panel and the second panel is different from the RGB stripe panel.

5. The method of claim 1,
    wherein the image data includes a multiview image for the first panel and the obtaining the first panel subpixel values comprises:
    extracting the first panel subpixel values of the selected subpixel and the neighboring subpixels based on the multiview image.

6. The method of claim 5, wherein the obtaining the point of view obtains the point of view from a table and the obtaining the area obtains the area from the table.

7. The method of claim 5, wherein the obtaining the point of view comprises:
    selecting one of a plurality of points of view in the multiview image based on the ray direction of the selected subpixel; and
    determining a position corresponding to the selected subpixel from the selected point of view based on a camera parameter for the multiview image.

8. The method of claim 7, wherein the camera parameter comprises at least one of:
    an angle of view of a camera for each of the plurality of points of view;
    a photographing direction of the camera for each of the plurality of points of view; and
    a distance between a subject and the camera for each of the plurality of points of view.

9. The method of claim 5, wherein the extracted first panel subpixel values are first panel subpixel values of neighboring pixels having a same color as the selected subpixel.

10. The method of claim 5,
    wherein, the obtaining the point of view determines a plurality of points of view corresponding to the selected subpixel when the subpixel corresponds to a plurality of points of view, and
    the obtaining the area determines a plurality of areas corresponding to the selected subpixel at the plurality of points of view,
    each of the plurality of areas including neighboring subpixels around the selected subpixel, the obtained area being one of the plurality of areas.

11. The method of claim 10, wherein the extracting comprises:
    extracting first panel subpixel values of neighboring subpixels having a same color as the selected subpixel in each of the plurality of areas; and
    interpolating the first panel subpixel values between the plurality of areas.

12. The method of claim 5, wherein the generating comprises:
    obtaining weights for the extracted first panel subpixel values based on the subpixel structure; and
    calculating the second panel value for the selected subpixel by performing a weighted summation on the extracted first panel subpixel values using the weights.

13. The method of claim 5, further comprising:
    obtaining positions of both eyes of a user; and determining whether the selected subpixel corresponds to a left eye or a right eye based on the positions of the eyes, wherein the determining of the area includes, selecting one of a plurality of points of view in the multiview image based on the position of the eye corresponding to the selected subpixel; and determining a position corresponding to the selected subpixel from the selected point of view based on a camera parameter for the multiview image.

14. The method of claim 1, wherein the image data includes a 3D model, the obtaining the first panel subpixel values comprises: generating first panel subpixel values of the selected subpixel and the neighboring subpixels based on the 3D model.

15. The method of claim 14, wherein the obtaining the point of view obtains the point of view from a table and obtaining the area obtains the area from the table.

16. The method of claim 14, wherein the obtaining the point of view comprises:

determining the point of view based on the ray direction of the selected subpixel from which the 3D model is viewed; and determining a position corresponding to the selected subpixel from the determined point of view based on a position at which a light propagated in the ray direction is incident to a virtual camera for the determined point of view.

17. The method of claim 14, wherein the generated values are first panel subpixel values of neighboring pixels having a same color as the selected subpixel.

18. The method of claim 14, wherein the generating comprises:

obtaining weights for the generated first panel subpixel values based on the subpixel structure; and calculating the second panel value for the subpixel by performing a weighted summation on the generated first panel subpixel values using the weights.

19. An image processing method comprising:

receiving image data for a first panel, the image data including a stereoscopic image for the first panel;

receiving positions of both eyes of a user; and processing the image data based on an optical characteristic of a second panel and a subpixel structure of a plurality of subpixels in the second panel, the second panel being configured for a 3D display device, the processing including, determining whether a selected subpixel in the second panel corresponds to a left image or a right image based on the positions of the eyes;

extracting first panel subpixel values in an area corresponding to the selected subpixel from the image corresponding to the selected subpixel; and generating a second panel value for the selected subpixel by filtering the extracted first panel subpixel values based on the subpixel structure of the second panel, the generated second panel value for the selected subpixel being used for a display using the 3D display device, and wherein the optical characteristic comprises a characteristic associated with a ray direction of the selected subpixel of the plurality of subpixels in the second panel.

20. The method of claim 19, wherein the selected subpixel corresponds to the left image when a light propagated in the ray direction of the selected subpixel reaches a position closer to a left eye of the user than a right eye of the user, and the selected subpixel corresponds to the right image when the light reaches a position closer to the right eye of the user than the left eye of the user.

21. The method of claim 19, wherein the extracted first panel subpixel values are first panel subpixel values of neighboring pixels having a same color as the selected subpixel.

22. The method of claim 19, wherein the generating comprises:

obtaining weights for the extracted first panel subpixel values based on the subpixel structure; and calculating the second panel value for the selected subpixel by performing a weighted summation on the extracted first panel subpixel values using the weights.

23. A non-transitory computer-readable medium comprising program code that, when executed by a processor, performs functions according to the method of claim 1.

24. An image processing apparatus comprising:

a receiver configured to receive image data for a first panel; and a processor configured to process the image data based on an optical characteristic of a second panel and a subpixel structure of a plurality of subpixels in the second panel, the second panel being configured for a 3D display device, the processor being configured to obtain a point of view corresponding to a selected subpixel in the second panel based on the optical characteristic, obtain an area corresponding to the selected subpixel within an image from the point of view based on the optical characteristic, the area including neighboring subpixels around the selected subpixel, obtain first panel subpixel values of the selected subpixel and the neighboring subpixels based on the received image data, and generate a second panel value for the selected subpixel by filtering the obtained first panel subpixel values based on the subpixel structure of the second panel, the generated second panel value for the selected subpixel being used for a display using the 3D display device, and wherein the optical characteristic comprises a characteristic associated with a ray direction of the selected subpixel of the plurality of subpixels in the second panel.

* * * * *